(12) United States Patent
Kajiyama et al.

(10) Patent No.: US 6,521,304 B1
(45) Date of Patent: Feb. 18, 2003

(54) LUMINESCENT TOOL, ITS AUXILIARY MEMBER AND METHOD OF PRESERVING BIOLUMINESCENT COMPOSITION USED IN THE TOOL AND THE AUXILIARY MEMBER

(75) Inventors: Naoki Kajiyama, Chiba (JP); Ayumi Arai, Chiba (JP); Eiichi Nakano, Saitama (JP); Hiroki Tatsumi, Chiba (JP); Teruo Watarai, Chiba (JP); Naoki Eisaki, Chiba (JP); Tatsuya Sakakibara, Chiba (JP); Masaru Suzuki, Chiba (JP)

(73) Assignee: Kikkoman Corporation, Chiba (JP)

( * ) Notice: Subject to any disclaimer, the term of this patent is extended or adjusted under 35 U.S.C. 154(b) by 0 days.

(21) Appl. No.: 09/331,292

(22) PCT Filed: Dec. 18, 1997

(86) PCT No.: PCT/JP97/04673

§ 371 (c)(1),
(2), (4) Date: Jun. 18, 1999

(87) PCT Pub. No.: WO98/28569

PCT Pub. Date: Jul. 2, 1998

(30) Foreign Application Priority Data

Dec. 20, 1996 (JP) .............................. 8-354666
Mar. 26, 1997 (JP) .............................. 9-090018
May 29, 1997 (JP) .............................. 9-154353
Jun. 5, 1997 (JP) .............................. 9-162012
Jun. 5, 1997 (JP) .............................. 9-162013
Jun. 10, 1997 (JP) .............................. 9-166664
Jun. 24, 1997 (JP) .............................. 9-181862
Jun. 24, 1997 (JP) .............................. 9-181863
Jun. 24, 1997 (JP) .............................. 9-181864

(51) Int. Cl.[7] .......................... F21K 2/06; C09K 11/07; A63H 33/22

(52) U.S. Cl. .......................... 428/15; 362/34; 446/219; 446/202; 446/405; 446/473; 222/1; 222/79; 222/394

(58) Field of Search ............................ 362/34; 446/219, 446/202, 405, 473; 428/15; 222/1, 79, 394

(56) References Cited

U.S. PATENT DOCUMENTS 3,463,915 A * 8/1969 Day .......................... 240/2.25
3,520,660 A * 7/1970 Webb .......................... 23/253
3,539,794 A * 11/1970 Rauhut et al. ................. 206/84

(List continued on next page.)

FOREIGN PATENT DOCUMENTS

| EP | 0 794 260 A1 | * 9/1997 | |
| JP | 63501571 | 6/1988 | |
| JP | 01141592 A | 6/1989 | |
| JP | 8-8863 | 8/1989 | |
| JP | 6-96 | 11/1995 | |
| JP | 8154699 | 6/1996 | |
| JP | 8275798 | 10/1996 | |
| JP | 8315601 | 11/1996 | |
| WO | WO 8702667 | 5/1987 | |
| WO | WO 97/29319 | 8/1997 | ............. F21K/2/00 |

*Primary Examiner*—Cynthia Hamilton
(74) *Attorney, Agent, or Firm*—Fish & Richardson P.C.

(57) ABSTRACT

The present invention relates to luminescent playthings such as candles, table lights, pen lights, illumination, illuminating playthings for camp, illuminating playthings for night fishing, fish-gathering lamps, safety candles, neon lights, luminescent inks, luminescent pens, luminescent coatings or luminescent writing implements, in which a soft light of an indescribable tone of color not obtainable from flames of conventional candles is emitted via seawater, lake and marsh water, river water, ground water, tap water or mineral drinking water by utilizing 3 components of luciferin, luciferase and ATP or 4 components of these components plus a metal salt, out of components necessary for bioluminescence in fireflies.

13 Claims, 1 Drawing Sheet

U.S. PATENT DOCUMENTS

| | | | | |
|---|---|---|---|---|
| 3,781,536 A | * | 12/1973 | Naeseth et al. | 240/2.25 |
| 3,861,072 A | * | 1/1975 | Holcombe | 43/17.6 |
| 4,184,193 A | * | 1/1980 | Heffernan et al. | 362/34 |
| 5,098,828 A | | 3/1992 | Geiger et al. | |
| 5,190,366 A | * | 3/1993 | World | 362/34 |
| 5,390,086 A | * | 2/1995 | Holland | 362/34 |
| 5,405,206 A | * | 4/1995 | Bedol | 401/7 |
| 5,410,962 A | * | 5/1995 | Collier | 101/375 |
| 5,651,209 A | * | 7/1997 | Rainey | 43/17.5 |
| 5,876,995 A | * | 3/1999 | Bryan | 435/189 |
| 5,891,659 A | * | 4/1999 | Murakami et al. | 435/8 |
| 5,947,579 A | * | 9/1999 | Horton et al. | 362/34 |

\* cited by examiner

LUMINESCENT TOOL, ITS AUXILIARY MEMBER AND METHOD OF PRESERVING BIOLUMINESCENT COMPOSITION USED IN THE TOOL AND THE AUXILIARY MEMBER

TECHNICAL FIELD OF THE INVENTION

The present invention relates to luminescent playthings which can be used preferably as candles, table lights, pen lights, illuminations, illuminating playthings for camps or night fishings, fish-gathering lamps, safety candles, neon lights, luminescent inks, luminescent pens, luminescent coatings or luminescent writing implements, in which a soft light with indescribable color tone not obtainable from flames of conventional candles is emitted via (or by adding) seawater, lake and marsh water, river water, ground water (including well water and hot-spring water), tap water, mineral drinking water, and the like (which are, in the present invention, referred to hereinafter as environmental water) by utilizing 3 components of luciferin, luciferase and ATP, or 4 components of these components plus a metal salt, out of components necessary for bioluminescence in fireflies or the like.

BACKGROUND OF THE INVENTION

Conventionally, a table is decorated with candles in Christmas Eve or a birthday party, or in a wedding reception a candlelight service is conducted where the bride and groom light a candle in each table for invited guests, or in a coffee bar, people drink tea and have a meal in a table decorated with candles under a slightly different atmosphere in dark illumination in a coffee bar or the like. Under soft lights of these candles, foods and human faces look beautiful and the atmosphere becomes more enjoyable.

The object of the present invention is to provide a luminescent plaything for emitting a soft light with indescribable color tone not obtainable from conventional candles, to an ancillary material thereof, and to a method of storing a luminescent composition used therein.

The present inventors have now surprisingly found that the combination of luciferin, luciferase and ATP, substantially free of a metal salt, does not emit light even if dissolved in water such as distilled water (or pure water) or deionized water substantially free of a metal salt, but when dissolved in environmental water such as seawater and river water, it emits a soft light with indescribable color tone not obtainable from flames of conventional candles, presumably due to its reaction with a trace of a metal salt dissolved in such water, and luminescence utilizable as playthings can thereby be expected.

The present inventors have further found that a luminescent plaything comprising the combination consisting of 4 components of luciferin, luciferase, ATP and a metal salt, which emits light with a color tone not obtainable from conventional candles when these 4 components are divided into at least 2 groups and mixed so as to be contained simultaneously in the form of a liquid state in an objective place, and also that when a fifth component being a buffer is combined with the 4 components, the luminescence is sustained.

Still further, the present inventors have found that the concentrations of luciferin, luciferase, ATP and a metal salt can be selected from a wide range from low to high concentrations, and if their concentrations are low, luminescent playthings with commodity worthy cannot be obtained, that is, it cannot be expected that the luminescence is sufficiently satisfactory when observed with the naked eye and is worthy of appreciation, but if the 4 components of luciferin, luciferase, ATP and a metal salt are contained at concentrations of 0.01 mM or more, 0.015 mg/ml or more, 0.002 mM or more, and 0.02 mM or more respectively, it can be expected that the luminescence is sufficiently satisfactory when observed with the naked eye and is worthy of appreciation.

Further, the luminescent plaything might have the problem that it is poor in luminescent stability, and use of a large amount of ATP, luciferin and luciferase is inevitable to attain the long duration of luminescence.

As a result of the intensive study under these present circumstances, the present inventors have found that upon luminescence reaction proceeding by the action of pyruvate orthophosphate dikinase in the presence of phosphoenolpyruvic acid, pyrophosphoric acid, magnesium ions, luciferin, luciferase and ATP, the ATP consumed by the reaction is continuously regenerated, thereby providing a luminescent plaything with highly stable luminescence without increasing the amount of ATP, luciferin and luciferase added.

The shape of the luminous body of this luminescent plaything is subject to the shape of a container for accommodating the luminescent plaything, so there is the inconvenience that it cannot be enjoyed without considering the shape of the container. This can be solved by providing a container (glass container) of desired size and shape to meet various expected requests, but even if it is theoretically possible to provide a container of arbitrary shape, there is actually a limit to manufacturing techniques or costs, so there is a problem that it is not practical. Further, a luminescent plaything in the form of a solution or powder has the problem that the duration of its luminescence is poor.

As a result of the intensive study under these circumstances, the present inventors have found that in a luminescent plaything comprising the combination of 4 components of luciferin, luciferase, ATP and a metal salt, the 4 components being not simultaneously mixed in a liquid state, at least one of the 4 components is granulated so that beautiful luminescence of arbitrary shapes (e.g., circle-, star-, heart-, ball-, triangle-, and alphabet-shapes) is obtained in transparent water and the luminescence is sustained.

Further, the present inventors have found that the dissolution rate of the luminescent plaything in water can be arbitrarily controlled by changing the hardness of the granulated material and the bulk density of the texture, and thus the duration of luminescence can be controlled, and further the granulated material is structured in such a concentric circle that luminescent layers and non-luminescent layers are laminated alternately to form a multi-layer construction whereby the luminescence can be intermittently depressed as the granulated material is dissolved, or the shape and size of the granulated material are selected and its surface is sprayed with water or is brought into contact with a wet cloth whereby new types of luminescent playthings not known so far can be provided. Furthermore, luminescence generally utilizing a luciferase derived from an organism emits monochromatic (yellow or yellowish green) light, but this time, the present inventors developed luciferases emitting red light and orange light respectively, in addition to yellow light in the prior art. However, it is difficult that these 3 kinds of luciferases emit yellow, red and orange lights respectively in the same solution, and it is also difficult that these lights are enjoyed (because the lights are mixed), so it is strongly desired to solve this problem. The present inventors have found that the 3 lights (i.e., yellow, red and orange lights) are emitted in the same solution like a mirror ball by previously granulating these 3 kinds of luciferases and then mixing the granulated materials with other components necessary for luminescence.

Further, the resulting luminescent plaything in the form of a solution is mixed as such, or in the form of powder, is dissolved in water etc. in order to promote luminescence, but its luminous body does not have a shape, so there is the disadvantage that its luminescence cannot be enjoyed unless it is placed in a container. By making its granulated material, luminescence having a shape can be enjoyed, but as the granulated material is dissolved, the shape inconveniently collapses and disappears. Thus the granulated material cannot maintain luminescence having a specific shape, namely, luminescence having a three-dimensional structure.

As a result of the intensive study under these circumstances, the present inventors have found that of components necessary for bioluminescence, at least one or all components are adsorbed into, or allowed to adhere to, an arbitrary carrier, and then brought into contact with the remaining components in water or via water, whereby luminescence having a desired shape and a three-dimensional structure can be maintained not only inside the container but also outside the container, and luminescent playthings with good luminescence stability can thereby be obtained.

A mixture of powdery components necessary for bioluminescence, obtained in the present invention, or granules produced by granulating the mixture in a granulator, or a material produced by permitting the mixture to be adsorbed into or adhered to an arbitrary carrier and then drying it is/are readily eluted (or diffused) in water significantly, thus making topical luminescence difficult and shortening the luminescence time when it is used as luminescence bait for fishing.

As a result of the intensive study under these circumstances, the present inventors have found that when, of components necessary for bioluminescence, at least one or all components after optionally granulated or after adsorbed into or allowed to adhere to an arbitrary carrier are coated on the surface thereof with a water-soluble substance, the elution of the components necessary for bioluminescence into water is slightly delayed or the spreading of the components is prevented, thereby being capable of providing luminescent playthings in which the time to initiate luminescence can be controlled and topically strong luminescence is sustainable.

Further, this luminescent plaything in the form of a solution is mixed as such, or in the form of powder, is dissolved in water or the like in order to promote luminescence, but because its luminescence is emitted through the water surface or the wall (transparent window) of a transparent container, there is the problem that the luminescence remains no change thus being not enjoyable.

As a result of the intensive study under these circumstances, the present inventors have found that when water-insoluble materials such as glass marbles, rock ice (e.g., rock-shaped ice-like plastic or acrylic materials), novel-metal foil (e.g., aluminum foil) etc. are provided within the bioluminescent liquid, the luminescence is emitted irregularly thereby increasing the glitter and further increasing the beauty.

Further, this luminescent plaything emits a soft light with indescribable color tone not obtainable from flames of conventional candles, and the color tone of the luminescence depends on luminescence emitted by luciferase, so luminescence having a desired color tone is not obtainable inconveniently. Although only the method disclosed in Japanese Patent No. 2,666,561 is known as a method of changing a color tone for luminescence, luminescence having desired and fine tones of color is hardly obtainable even using this prior art method.

As a result of the intensive study under these circumstances, the present inventors have found that when a coloring matter is added to a bioluminescence reaction system, luminescence with desired color tone can be obtained.

Further, this luminescent plaything has the disadvantage that it is poor in stability to light and oxidation, and its luminescence stability is lost in a short period.

As a result of the intensive study under these circumstances, the present inventors have found that even if at least 2 components out of components necessary for bioluminescence are integrally mixed, the inhibition of luminescence does not occur, and this mixture is put in a light- and gas-impermeable container, and optionally at least one matter selected from the group consisting of an antioxidant, a desiccant and an inert gas is further introduced into the container which is in turn closed tightly, whereby it is possible to prevent a reduction in luminescence stability, and this tightly closed container is stored under forcible cooling whereby it is possible to prevent a reduction in luminescence stability.

DISCLOSURE OF THE INVENTION

The present invention provides a luminescent plaything comprising a composition containing 3 components of luciferin, luciferase and ATP as bioluminescent components. These 3 components is substantially free of a metal salt.

The present invention also relates to a luminescent plaything comprising a combination of environmental water and a composition containing 3 components of luciferin, luciferase and ATP, the environmental water and the composition being not simultaneously mixed in a liquid state. Here, the environmental water includes seawater, lake and marsh water, river water, ground water, tap water, and mineral drinking water.

The present invention further provides a luminescent plaything comprising a composition containing 4 components of luciferin, luciferase, ATP and a metal salt as bioluminescent components, the 4 components being not simultaneously mixed in a liquid state.

The present invention provides a luminescent plaything comprising a composition containing 5 components of luciferin, luciferase, ATP, a metal salt and a buffer agent as bioluminescent components, the 4 components of luciferin, luciferase, ATP and a metal salt being not simultaneously mixed in a liquid state.

The contents of luciferin, luciferase, ATP and a metal salt are 0.01 mM or more, 0.015 mg/ml or more, 0.002 mM or more, and 0.02 mM or more, respectively.

The present invention provides a luminescent plaything comprising a composition containing pyruvate orthophosphate dikinase, phosphoenolpyruvic acid, pyrophosphoric acid, luciferin, luciferase, ATP and a metal salt as luminescent components, the 4 components of luciferin, luciferase, ATP and a metal salt being not simultaneously mixed in a liquid state.

The present invention provides a luminescent plaything comprising a composition containing 4 components of luciferin, luciferase, ATP and a metal salt as luminescent components, the 4 components being not simultaneously mixed in a liquid state, at least one of the 4 components being a granulated material.

The present invention provides a luminescent plaything comprising a composition containing 4 components of luciferin, luciferase, ATP and a metal salt as luminescent components, the 4 components being not simultaneously mixed in a liquid state and being integrally granulated. The granulated material may be in the form of granules, capsules, tablets, pellets, sheets, flakes or beads.

The present invention provides a luminescent plaything comprising luminescent components in which at least one of 4 components of luciferin, luciferase, ATP and a metal salt is absorbed into or adhered to a carrier, and the absorbed or adhered component emits a light via water containing the remaining components or via water. The exemplary carrier includes fabrics, nonwoven fabrics, fibers, woods, papers, sponges, mesh structures and dried flowers.

The present invention provides a luminescent plaything wherein at least one or all of the components necessary for luminescence, after optionally granulated or after adsorbed into or adhered to a carrier, are covered on the carrier surface with a water-soluble substance.

The present invention provides a method for generating bioluminescence which comprises adding a luminescence-aiding material consisting of an arbitrary shape of a water-insoluble body to a bioluminescent liquid. The bioluminescence-aiding material is, for example, one having a gloss surface. The bioluminescent liquid may comprise a composition containing 4 components of luciferin, luciferase, ATP and a metal salt, the 4 components being not simultaneously mixed in a liquid state.

The present invention provides a luminescent plaything comprising a combination of bioluminescent components and a coloring matter.

The present invention provides a method for generating bioluminescence which comprises adding a coloring matter to the bioluminescent components in order to change a color tone of luminescence.

Examples of the luminescent plaything include candles, table lights, pen lights, illumination, illuminating playthings for camps, illuminating playthings for night fishings, fish-gathering lamps, safety candles, neon lights, lights on ice, luminescent inks, luminescent pens, luminescent coatings, or luminescent writing implements. The lights on ice make use of 4 components of luciferin, luciferase, ATP and a metal salt as components in the form of powder, and these components are dissolved in divided portions or in one portion in the surface water on ice thereby emitting a light. The luminescent writing implements comprise a composition containing 4 components of luciferin, luciferase, ATP and a metal salt as bioluminescent components, the 4 components being not simultaneously mixed in a liquid state, wherein the 4 components are divided into a group of a luminescent base ink containing at least one of the components and a group of an luminescent ink ancillary material containing the other components, and one of the groups is fixed by adhesion or absorption to a carrier, and the other group is maintained in an ink accommodating section in a writing implement so that the writing implement can be used to write on the surface of the carrier thereby emitting a light.

The present invention provides a method of storing a bioluminescent composition wherein, of components necessary for bioluminescence, at least 2 components are put in a gas- and light-impermeable container and closed tightly.

The present invention provides a method of storing a bioluminescent composition wherein, of components necessary for bioluminescence, at least 2 components are put in a gas- and light-impermeable container, and simultaneously at least one matter selected from the group consisting of an antioxidant, a desiccant and an inert gas is added thereto, and then the container is closed tightly.

The present invention provides a method of storing a bioluminescent composition wherein, of components necessary for bioluminescence, at least 2 components are put in a gas- and light-impermeable container and closed tightly, and the container is stored under forcible cooling.

Here, the components necessary for bioluminescence may comprise a composition containing 4 components of luciferin, luciferase, ATP and a metal salt, the 4 components being not simultaneously mixed in a liquid state. Further, the light- and gas-impermeable container is a plastic bag container made of a film having a metal film vapor-deposited on a synthetic resin film, a metal film, or a film having a metal film laminated on the synthetic resin film, or a hollow container made of synthetic resin or glass covered thereon with a light-impermeable film, coated with a light-impermeable coating, or made of brown or black materials.

Hereinafter, the present invention will be described in detail.

First, the luciferin used in the present invention refers to luciferin, luciferin derivatives and luciferin precursors.

The luciferin derivatives include, for example, D-luciferin-O-sulfate, D-luciferin methyl ester, D-luciferin-O-phosphate, D-luciferin-L-phenylalanine, D-luciferin-L-$N_\alpha$-arginine, and the like.

The luciferin derivatives include, for example, 2-cyano-6-methoxybenzothiazole, D-cysteine, and the like.

The luciferase includes, for example, luciferases derived from Coleoptera such as *Luciola cruciata, Luciola lateralis, Luciola mingrelica, Lampyria nactiluca, Photinus pryalis, Photuris pennsylvanica, Hotaria parvula, Pyrocoelia miyako*, and *Pyrophorus plagiophthalamus*, or these luciferases or mutants thereof produced by genetic recombination as well as other luciferases derived from non-Coleoptera.

ATP means ATP, its salts, and an ATP-forming reaction system.

The ATP-forming reaction system includes, for example, a method of forming ATP from phosphoenolpyruvic acid and ADP in the presence of pyruvate kinase as a catalyst, a method of forming ATP from creatine phosphoric acid and ADP in the presence of creatine kinase as a catalyst, and other methods.

The metal salt means divalent metal salts, for example, magnesium salts such as magnesium sulfate, magnesium chloride, and the like, manganese salts such as manganese sulfate, manganese chloride, and the like.

In the present invention, a buffer or an enzyme stabilizer can also be contained in addition to the components used.

The buffer is suitably used for maintaining the luminescence reaction solution in the optimum pH range for luciferase, and includes, for example, glycine-NaOH buffer, HEPES buffer, Tris buffer, etc. The addition of such a buffer (or buffer solution) results in significant extension of luminescence.

The exemplary enzyme stabilizer includes sugars, such as sucrose, and glycerol.

By adding the enzyme stabilizer, the effect of significant extension of luminescence is attained.

In the luminescent plaything according to the present invention, it is important that the luminescent plaything comprises a combination of environmental water and a composition containing 3 components of luciferin, luciferase and ATP substantially free of a metal salt, the 3 components and environmental water being not simultaneously mixed in a liquid state. If the 3 components and environmental water are mixed simultaneously in a liquid state, luminescence reaction is rapidly initiated, and after the luminescence reaction is finished, the plaything looses its value as a commodity.

In the present invention, the term "substantially free of a metal salt" means that each of the 3 components does not contain a metal salt at all or that a metal salt, if any, hardly has the ability to promote luminescence. This can be achieved by preventing any contamination of metal salts when the 3 components are prepared, or by addition of a chelating agent, if the contamination can not be prevented, resulting in inhibition of a luminescence reaction caused by a metal salt.

The luminescent plaything lacking at least one of the 3 components fails to occur a luminescence reaction and, in this case, it is impossible to utilize as a luminescent plaything. Further, even the combination of the 3 components and water fails substantially to occur a fluorescence reaction if the water is pure water (or distilled water) or deionized water free of metal salts rather than environmental water, so it cannot be used. Thus, pure water or deionized water cannot be utilized in the luminescent plaything of the present invention, but the pure or deionized water in which a metal salt(s) (magnesium salt, manganese salt, etc.) is dissolved can rapidly initiate a luminescence reaction and so this characteristic can be utilized in luminescent playthings.

The luminescent plaything comprising a combination of the 3 components of luciferin, luciferase and ATP substantially free of a metal salt can initiate luminescence when mixed with environmental water, particularly with seawater, and the luminescent plaything which, by virtue of this characteristic, is preferable as an illuminating plaything for night fishing or as a fish-gathering lamp can be obtained.

That is, the illuminating plaything for night fishing is a fishing tackle such as a fishing line, a hook (including a fly), a sinker, a float or a fishing rod, which brightly illuminates in water as a whole or topically. The fish-gathering lamp is used to improve fishing efficiency by use of the property (i.e., taxis) of fish gathering toward light, and in this case the luminescent plaything itself is used in water.

For use in water, there are the following methods: 1) the luminescent plaything of the present invention in the form of liquid, solid or powder, directly or after encapsulated in a water-permeable or water-impermeable packaging bag, is introduced into or embedded in a bait (e.g., fly, natural, synthetic or semi-synthetic bait, or chum) or mixed with a bait for aquatic animals (e.g., mollusks such as cuttlefish, octopus and lobster, and fishes) living in sea, rivers, lakes andmarshes, or applied onto (adhered to) the surface of the bait, whereby the bait itself emits light; and 2) the luminescent plaything is kept near the bait or a hook, whereby the vicinity of the bait and hook is kept bright.

It is also important that the luminescent plaything of the present invention comprises the 4 components of luciferin, luciferase, ATP and a metal salt which are not simultaneously contained in a liquid state. If the 4 components are simultaneously contained in a liquid state, then a luminescence reaction is rapidly initiated, and after the luminescence reaction is finished, the plaything looses its value as a commodity.

However, if the 4 components are not in a liquid state, i.e., if they are in the form of dry powder, no luminescence reaction occur even if they are contained simultaneously, and in this case, use as a luminescent plaything is possible.

In this case, a truly magic luminescent plaything which, upon being merely mixed with water or a buffer, initiates a luminescence reaction can be provided.

Further, the luminescent plaything of the present invention is a luminescent plaything comprising a combination containing 4 components of luciferin, luciferase, ATP and a metal salt, the 4 components being not simultaneously mixed in a liquid state, wherein the 4 components are divided into a group of a luminescent base ink containing at least one of the 4 components and a group of an luminescent ink ancillary material containing the other components, and one of the groups is fixed by adhesion or absorption to a carrier (e.g., paper, woven fabric, nonwoven fabric, wood, etc.), and the other group is maintained in an ink accommodating section in a writing implement so that the writing implement can be used to write on the surface of the carrier thereby emitting a light, whereby one can draw luminescent letters, luminescent figures, luminescent drawings, etc.

It is also important that the 4 components of luciferin, luciferase, ATP and a metal salt have the final concentrations of 0.01 mM or more, 0.015 mg/ml or more, 0.002 mM or more, and 0.02 mM or more, respectively. If the contents of the respective components are lower than the above values, luminescence which is satisfactory when observed with the naked eye and worthy of appreciation cannot be obtained.

The concentrations of the 4 components, and the preferable concentration ranges of a buffer and an enzyme stabilizer, if used, are as follows (shown as final concentrations):

(1) Luciferin:
   0.01 mM or more, preferably 0.03 to 50 mM, most preferably 0.10 to 12 mM.
(2) Luciferase:
   0.015 mg/ml or more, preferably 0.05 to 20.0 mg/ml, most preferably 0.15 to 5 mg/ml.
(3) ATP:
   0.002 mM or more, preferably 0.02 to 50 mM, most preferably 0.2 to 20 mM.
(4) Magnesium Sulfate (metal salt):
   0.02 mM or more, preferably 0.1 to 300 mM, most preferably 0.5 to 100 mM.
(5) pH of Buffer:
   pH 5.0 to 11.0, preferably 6.0 to 10.0, most preferably 7.0 to 9.0. e.g., Glycine-NaOH Buffer (pH 7.5):
   0.01 mM or more, preferably 1 mM to 2.0 M, most preferably 0.1 to 1.0 M.
(6) Sucrose (enzyme stabilizer):
   0.1 mM or more, preferably 1 to 300 mM, most preferably 10 to 50 mM.

It is also important that the luminescent plaything of the present invention comprises a combination containing pyruvate orthophosphate dikinase, phosphoenolpyruvic acid, pyrophosphoric acid, luciferin, luciferase, ATP and a metal salt, the 4 components of luciferin, luciferase, ATP and a metal salt being not simultaneously mixed in a liquid state.

According to this invention, said combination is mixed via water whereby a luminescent plaything having high luminescence stability can be obtained.

The present invention is characterized in that as shown in the following reaction system, the reaction shown in the broken line (A) in which pyruvate orthophosphate dikinase is allowed to act on AMP, pyrophosphoric acid, phosphoenolpyruvic acid and magnesium ions to convert them into ATP, pyruvic acid and phosphoric acid is combined with the reaction shown in the broken line (B) in which luciferase is allowed to act on ATP, luciferin, dissolved oxygen and magnesium ion to generate AMP, pyrophosphoric acid, oxyluciferin, carbon dioxide gas and light.

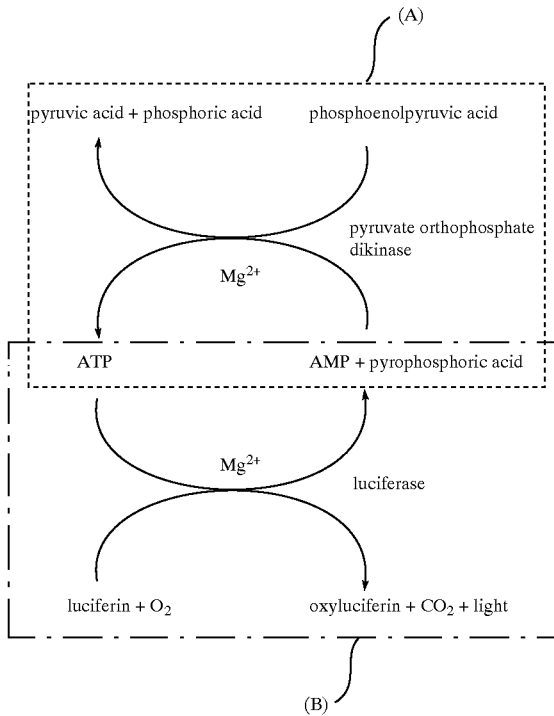

In the reaction system, ATP is consumed in the reaction (B) with occurrence of luminescence thereby forming AMP and pyrophosphoric acid, which in turn contribute the regeneration of ATP in the reaction (A). The regenerated ATP is subjected again to the reaction (B) where the ATP is consumed with occurrence of luminescence.

Thereafter, these two reactions proceed simultaneously, and luminescence is kept at a constant high level for at least 10 minutes without decay of luminescence.

The pyruvate orthophosphate dikinase used in the present invention is an enzyme which catalyzes the reaction of generating ATP, pyruvic acid and phosphoric acid by acting on AMP, phosphoenolpyruvic acid and pyrophosphoric acid in the presence of a magnesium ion and also catalyzes its reverse reaction. Physicochemical properties of the enzyme, as well as production processes thereof, have already been known, and the enzyme itself is readily available.

The enzymes, derived from microorganisms and plants are known.

The microorganism-derived enzymes includes, for example, enzymes produced by microorganisms such as *Propionibacterium shermanii* [Biochemistry 10, 721–729 (1971)], *Acetobacter xylinum* [Journal of Bacteriology (1970)], *Bacteroides symbiosus* [Methods in Enzymology 42, 199–212 (1975)], and microorganisms belonging to the genus Microbispora (e.g. *Microbispora thermorosea* IFO14047).

Further, the plant-derived enzymes include, for example, enzymes derived from corn leaves [Biochemistry 12, 2862–2867 (1973)] and sugarcane leaves [The Biochemical Journal 114, 117–125 (1969)].

One example of the process for producing pyruvate orthophosphate dikinase by a microorganism is set forth below:

50 ml of a medium (pH 7.0) containing 0.2% yeast extract, 0.2% casamino acid, 0.001% ferrous sulfate, 0.05% potassium chloride, 0.1% dipotassium phosphate, 0.05% magnesium sulfate, and 0.3% lactic acid is put in an Erlenmmeyer flask (500 ml volume) and then sterilized at 121° C. for 15 minutes.

*Microbispora thermoroaes* IFO14047 is inoculated into this medium and cultured at 45° C. overnight under shaking to give a culture.

50 ml of the obtained culture is inoculated into a 5-L Erlenmmeyer flask containing 1 L medium having the same composition as above and cultured overnight to give a culture.

500 ml of the resulting culture is inoculated into each of two 30-L jar fermentors each containing 20 L medium with the same composition as described above and then cultured under shaking at an aeration rate of 20 L/min. at a stirring rate of 300 r.p.m. at 45° C. for 24 hours.

At the end of the cultivation, the microorganism is harvested from 40 L of the culture through Microsa (Asahi Chemical Industry Co., Ltd.). 20 mM HEPES buffer (pH 7.5) containing 5 mM EDTA, 1 mM $MgSO_4$ and 1 mM DTT (referred to hereinafter as buffer A) is added to part (200 g) of the microorganism, which is then suspended sufficiently to give a 700 ml suspension.

Purificaiton of pyruvate Orthophosphate Dikinase:

700 ml of the above-obtained microbial suspension is purified in the following steps:

step 1

(Preparation of Crude Enzyme Solution)

8.75 g of lysozyme (Nagase Seikagaku Kogyo K. K.) is added to 700 ml of the above microbial suspension, and the suspension is left for 2 hours at room temperature under gentle stirring. Then, 23.1 g of diammonium phosphate is added thereto, followed by stirring at room temperature for 2 hours to disrupt the microorganism.

The resulting liquid is centrifuged at 7000 r.p.m. for 15 minutes, and the supernatant is thus collected to give a 620 ml liquid.

step 2

(First QAE-Sephadex Chromatography)

Sulfate ammonium is dissolved at the concentration of 2 g/100 ml in 620 ml of the liquid of step 1, and this solution is passed through about 700 ml QAE-Sephadex resin (Pharmacia) previously equilibrated with buffer A (pH 7.5) containing 0.15 M ammonium sulfate whereby the enzyme is adsorbed onto the resin. It is washed with buffer A (pH 7.5) containing 0.15 M ammonium sulfate to remove unnecessary proteins, and the enzyme is eluted with buffer A (pH 7.5) containing 0.6 M ammonium sulfate.

step 3

(Second QAE-Sephadex Chromatography)

The above eluate is concentrated in a hollow fiber ultrafiltration unit (PAN 13-DX, Asahi Medical Co., Ltd.) and then applied to a column (6 cm ⌀×15 cm) packed with QAE-Sephadex previously equilibrated with buffer A (pH 7.5) whereby the enzyme is adsorbed on the resin. Then, the column is washed with buffer A (pH 7.5) containing 0.15 M ammonium sulfate to remove unnecessary proteins, and the enzyme is subsequently eluted with 3L of a buffer with a gradient from buffer A (pH 7.5) containing 0.15 M ammonium sulfate to buffer A (pH 7.5) containing 0.8 M ammonium sulfate.

step 4

(Butyl Toyopearl Chromatography)

Following recovery of the above active fraction, sulfate ammonium is added thereto to a concentration of 1 M. The resultant is applied to a column (4.5 cm ø×15 cm) packed with Butyl Toypearl (Tosoh corporation) previously equilibrated with buffer A (pH 7.5) containing 1 M sulfate ammonium whereby the enzyme is adsorbed onto the resin.

The protein is eluted with 1.2 L buffer A (pH 7.5) with a gradient from 1.0 M to 0 M ammonium sulfate in buffer A (pH 7.5) (1.2 L in total).

step 5

(Gel Filtration Chromatography)

The active fraction obtained in step 4 is concentrated to 2 ml using Amicon ultrafiltration membrane unit (cut off: 10,000), and 100 µl aliquot is subjected to gel filtration by passing it through a TSK gel G3000 SW XL column (Tosoh Corporation) (0.76 cm □×30 cm×2 columns) previously equilibrated with 20 mM HEPES buffer (pH 7.5) containing 0.3 M ammonium sulfate.

The whole of the enzyme is subjected to gel filtration, and the obtained active fraction is concentrated. The active fraction is subjected to the same columns and the eluted active fraction, 5.4 ml, was collected.

This fraction is an authentic sample of the present enzyme which is determined to be homogeneous by SDS-polyacrylamide gel electrophoresis, and the total protein is 6.65 mg, the total activity is 66.0 U, and the specific activity is 9.92 U/mg.

Method of Measuring the Titer of Pyruvate Orthophosphate Kinase:

(Method of Quantifying Formed ATP by a Luminescent Method)

180 µl of 50 mM BIS-TRIS PROPANE buffer (pH 6.8) containing 3 mM magnesium sulfate, 25 mM ammonium sulfate, 2 mM 2-mercaptoethanol, 2 mM pyrophosphoric acid, 2 mM phosphoenolpyruvic acid and 0.1 mM AMP is put in a microtube. After the temperature is equilibrated at 37° C., 20 µl of an enzyme solution having a suitable activity is added to the tube and, the mixture is incubated for 15 minutes, then boiled in boiling water for 3 minutes to terminate the reaction. This reaction mixture is diluted suitably, and 50 µl aliquot thereof is put in a test tube, 50 µl "Lucifer LU" solution (Kikkoman Corporation) is added dropwise thereto, and the level of luminescence is measured.

Separately, a calibration curve in which ATP standard solutions with predetermined concentrations are used to examine the relationship with luminescence levels is prepared.

This graph is used, and the amount of the enzyme for producing 1 µmol ATP per minute at 37° C. is arbitrarily defined as 1 U.

In the present invention, it is also important that at least one of the 4 components in the form of powder is granulated whereby the duration of luminescence can be significantly increased as compared with either case where all the 4 components are aqueous solutions or powder.

For granulation of the 4 components of luciferin, luciferase, ATP and a metal salt, these can be granulated in a usual manner into granules, capsules, tablets, pellets (including bars), sheets, flakes or beads, directly or after an excipient, a binder etc. are added to each of the 4 components or to a combination of 2 or more components.

To make granules, granulation processes such as wet granulation process and dry granulation process can be used.

In the wet granulation process, about 5 to 30 parts by weight of water is added to 100 parts by weight of materials to be granulated (however, water cannot be added simultaneously to the 4 components, so the 4 components should not be contained simultaneously in the materials to be granulated), and these are uniformly moistened and granulated in a granulator.

In this case, a granulator such as extrusion granulator, sand granulator or fluidized bed granulator is preferably used.

The resulting granules are dried to a water content of about 0.1–5% at a temperature of 90° C. or less by drying such as air drying or fluidized bed drying.

In general, the granules are preferably prepared such that a particle size in the range of about 0.2 to 2 mm is achieved.

Then, the granules are sieved by a shifter or screen having a specific opening.

To make beads, the materials are formed into spherical or nearly spherical beads having particle sizes with a narrow distribution in the range of 0.5 to 20 mm by amicrocapsule method or a CF (centrifugation) method or by means of a sphere shifter at high-speed revolution.

To make tablets, the materials or the granules obtained by the method as described above are formed into tablets. The shape of tablets may be an arbitrary shape such as circle-, star-, heart-, ball-, triangle-, or alphabet-shape., and generally the tablets are preferably circle-shaped with concave or convex surface, having a diameter (or the maximum length) of about 2 mm to 10 cm and a thickness of about 0.5 mm to 5 cm and weighing about 10 mg to 50 g, preferably 100 mg to 25 g, more preferably about 200 mg to 5 g.

To make pellets, it is preferable that the materials are extruded into pellets (including bars) with a diameter of 0.2 to 10 mm and a length of 2 mm to 30 cm in an extrusion granulator.

When formed into long and narrow bars, it is preferable that these can be used like a pencil and a lead in a mechanical pencil.

The excipient includes starch, dextrin, lactose, egg white, soybean protein, gelatin, etc., and the binder includes carboxymethyl cellulose, alginic acid, salts thereof, polyvinyl alcohol, polyacrylic acid, salts thereof, polymethacrylic acid, gum arabic, sucrose, polysaccharides, starch pastes, fats and oils, etc.

The means of granulating at least one of the 4 components includes a method in which the luciferin, luciferase, ATP and a metal salt are formed into particles in a usual manner by granulating themselves or their mixture (also referred to hereinafter as materials to be granulated) having other components added thereto (e.g., at least one matter selected from a buffer, an enzyme stabilizer, a binder, an excipient, an extender, a pigment and a perfume may be added in such a range as not to inhibit luminescence).

Specifically, mention may be made of a method in which the respective components of luciferin, luciferase, ATP and a metal salt are separately granulated to produce 2 kinds or more of particles, or are integrally granulated after other components are optionally added thereto.

According to the present invention, a luminescent plaything with a luminescence duration improved by bringing it in contact with water can be obtained.

It is also important in the present invention that, of the 4 components, at least one or all components are adsorbed or adhered to a carrier.

That is, it is important that the 4 components or a combination of 2 or more components are adsorbed or adhered to a carrier in a usual manner directly or after an excipient, a binder etc. are added thereto, followed by natural drying or lyophilization.

The carrier used herein is at least one matter selected from the group consisting of fabric, nonwoven fabric (including felt), (natural, synthetic, or glass) fiber, wood, paper, a sponge-like structure (e.g., rubber-like material having holes thereon like sponge, such as polyurethane sponge, urethane sponge, or spongy carrier for chromatography), a mesh structure (e.g., a shaped article or an embodied object made of a mesh film of synthetic resin), and a dried flower.

The excipient includes starch, dextrin, lactose, egg white, soybean protein, gelatin, etc.

The binder includes carboxymethyl cellulose, alginic acid, salts thereof, polyvinyl alcohol, polyacrylic acid, salts thereof, polymethacrylic acid, gumarabic, starchpaste, sucrose, polysaccharides, fats and oils, etc.

According to the present invention, the luminescent plaything can be produced in this manner in any shape such as planar shapes (cubic, square, regular square, rectangular, triangular, trapezoid, pentagonal, hexagonal, polygonal, and circular), three-dimensional shapes (e.g., prism, cubic, rectangular parallel-epiped, and cylindrical), spherical shapes, pyramidal shapes (e.g., conical, pentagonal, hexagonal, and polygonal), letter shapes (e.g., alphabets, katakana, hiragana, and numerals), determined shapes (e.g., heart, egg, bow, fan, turtle shell, wedge, stripe, and wave-shaped), logo marks, symbol marks, signs, embodied objects (e.g., shapes embodying animals and plants), gardening articles, daily commodities, writing materials, office supplies, electric appliances, toys (e.g., dolls, stuffed toys, swords, guns, and robots), musical instruments, vehicles, buildings, etc.

Further, it is important in the present invention that, of the components necessary for bioluminescence, at least one or all components, after optionally granulated or after adsorbed or adhered to a carrier, are covered on the surface thereof with a water-soluble substance.

In the present invention, the means of granulating the components essential for luminescence includes a method in which the luciferin, luciferase, ATP and a metal salt are formed in a usual manner into granules, capsules, tablets, pellets (including bars), sheets, flakes or beads by granulating themselves or a combination of 2 or more components after other components are added thereto (e.g., at least one matter selected from a buffer, an enzyme stabilizer, a binder, an excipient, an extender, a pigment and a perfume may be added thereto in such a range as not to inhibit luminescence.).

In the method of allowing the 4 components of luciferin, luciferase, ATP and a metal salt necessary for bioluminescence to be absorbed, or adhered to a carrier in the present invention, the 4 components or a combination of 2 or more components are absorbed or adhered to the carrier in a usual manner directly or after an excipient, a binder etc. are added thereto, followed by natural drying or lyophilization.

To cover the surface of at least one or all of the components necessary for bioluminescence with a water-soluble substance, the components are immersed in (or brought into contact with) an aqueous solution (or a colloidal solution) of the water-soluble substance, followed by lyophilization, or alternatively the surface of the components is sprayed with the water-soluble substance and then slightly scattered with water whereby the substance is swollen and dissolved in the form of colloid, followed by lyophilization.

The surface of the components can thereby coated with the water-soluble substance.

The concentration of the water-soluble substance in an aqueous solution is 0.1 to 10 (W/W) %, preferably 0.5 to 3%.

The water-soluble substance used herein is one or more matters selected from carboxymethyl cellulose, carboxyethyl cellulose, starch, dextrin, lactose, eggwhite, soybeanprotein, gelatin, alginic acid and salts thereof, polyvinyl alcohol, polyacrylic acid and salts thereof, polymethacrylic acid, gum arabic, starch paste, sucrose and polysaccharides.

Among these, carboxymethyl cellulose, carboxyethyl cellulose and gelatin are particularly preferable.

The water-soluble substance, when brought into contact with a small amount of water, is swollen with moisture to form colloid, and by suitably controlling the amount of water, a coating having a different thickness can be formed on the surface of the luminescence components.

If the coating having a different thickness is formed on the surface of the luminescent components, the luminescent plaything can topically emit a light when it has reached an objective depth (or a point) in seawater, so it can be used preferably as a luminescent bait for fishing.

As the luminescent bait for fishing, the luminescent plaything can be used as such, but preferably it is used after mixed with a known bait for fishing.

The bait for fishing includes alive fishes, natural baits such as cut fishes, shrimps, cuttlefishes, krill, annelids etc., or synthetic baits such as mixtures of fish ground meats or extracts and starch, potatoes etc. or mixtures of fish meals or fish and shellfish extracts and a gelling agent for food.

Further, it is important in the present invention that the above-described bioluminescent fluid is provided therein with a luminescence-aiding material consisting of an arbitrarily shaped water-insoluble body.

The water-insoluble material used in the present invention may be made of any arbitrary water-insoluble material. For example, mention is made of glass, crystal glass, synthetic resin (plastic), metal, wood, paper, rubber, stone, ceramic ware, natural flowers and trees, minerals, wax etc.

Further, the water-insoluble body includes (1) ball (or marbles), beads, polyhedron body (e.g. mirror ball), ring, rock ice (rock-shaped ice-like plastic or acrylic materials), fiber body, (2) film, (3) metal foil such as gold foil, aluminum foil etc., (4) natural flowers and trees, alive flowers and dried flowers, (5) articles (e.g. artificial flowers) embodying natural flowers and woods, animals, dolls, ornaments, toys, and small equipment, (6) precious stones such as jewels, ores, natural stones, imitation jewels etc., (7) candles, and (8) accessories such as bracelets, rings, earrings, pendants etc.

These water-insoluble bodies should have such a size that they can be provided in the bioluminescent liquid, but their shape, color and transparency may be arbitrary.

Specifically, mention can be made of those which are colorless and transparent, colored and transparent, colorless and semitransparent, colored and semitransparent, colorless and opaque, and colored and opaque.

If water-insoluble bodies with gloss on the surface, e.g., a plurality of glass marbles, rock ices, jammed bent plastic film, metal foil etc., can be preferably used in the present invention to provide a luminescent liquid with luminescence emitted irregularly thereby increasing the glitter and further increasing the beauty.

The method of providing the water-insoluble body in the luminescent liquid includes a method of floating it on the surface of the luminescent liquid or a method of sinking a part or the whole of it in the luminescent liquid.

According to the present invention, the liquid emitting bioluminescence can be provided therein with water-insoluble bodies such as marbles, rock ices, plastic film or metal foil, whereby there can be provided a luminescence-aiding material having the function of emitting the luminescence irregularly thereby increasing the glitter and increasing the beauty as well as the luminescent method of using the luminescence-aiding material. Further, by providing the water-insoluble material therein, there can be provided a luminescent plaything which is attractive even using a small amount of the luminescent liquid.

Further, it is important in the present invention that a coloring matter is added to the bioluminescence reaction system whereby emission having a desired tone of color is obtained.

The coloring matter used herein includes pigments, coloring agents (containing luminescent coloring agents) and paints. The pigments include edible red No. 3 (dark pink), red edible red No. 102 (dark red), edible yellow No. 5 (yellow), edible green No. 3 (bluish green), edible blue No. 1 (blue), edible blue No. 2 (ultramarine), β-carotin pigment (bright golden yellow), paprika pigment (cinnabar), paprika pigment (orange), gardenia yellow pigment (lemon yellow), annatto pigment (dark orange), annatto pigment (orange), berry pigment (red wine color), cacao pigment (dark brown), kaoliang pigment (pale brown), shisonin pigment (violet), chotinyl pigment (rose wine color), copper chlorophylline sodium (green), Monascus pigment (reddish violet), Monascus yellow pigment (luminescent lemon yellow), gardenia blue pigment (dark ultramarine), BV14 MAGENTA pdr (red, from Daimatsu Sangyo K. K.), Suminol Milling Green G (green, from Sumitomo Chemical Co., Ltd.) etc., and the paints include watercolors. These are used preferably at concentrations of 0.00001 to 3.0 (W/V) %, more preferably 0.001 to 1.0 (w/v) %.

Further, it is also important in the present invention that of the bioluminescent components necessary for bioluminescence, at least 2 components are introduced into a light- and gas-impermeable container and closed tightly.

Further, it is also important that the container is stored under forcible cooling.

In the present invention, at least 2 components of the components necessary for bioluminescence are mixed.

That is, at least 2 components, preferably 3 components, and more preferably all the components (excluding the case where they are in a liquid state) are mixed.

It is important that at least 2 components are mixed (integrated into one body). If the components necessary for luminescence are used (individually), that is, if each component is packaged, it is the trouble that each component should be packaged and handled for use, and the operation of mixing the respective components at a suitable mixing ratio is troublesome.

However, if at least 2 components of the components necessary for bioluminescence are mixed (even if the 2 components are mixed, the inhibition of luminescence does not occur as described above), it is easier to mix the components, or if all the components (as the dried matter) are mixed (where the inhibition of luminescence does not occur as described above), the mixture can achieve the object (i.e. generation of fluorescence) by merely opening its container and then mixing it with water or a buffer solution.

The light- and gas-impermeable container used in the present invention includes film-shaped bag containers made of (1) a single film consisting of polyethylene, polypropylene etc., or a film having a metal such as aluminum vapor-deposited on a film of synthetic resin such as polyester, oriented nylon or cellophane with a polyolefin thermal adhesion resin laminated thereon, (2) a metal film such as aluminum foil etc., (3) a film having a metal film laminated on the synthetic resin film, and hollow containers (plastic blown bottles, glass bottles etc.) such as (4) a hollow container covered thereon with a light-impermeable film, (5) a hollow container coated with a light-impermeable coating and (6) a hollow container made of brown or black materials.

In the present invention, it is important to use the light- and gas-impermeable container, and when a light- and/or gas-permeable container is used, it is not possible to prevent reduction of luminescence stability.

When the bioluminescent composition is introduced into the light- and gas-impermeable container and closed tightly, an antioxidant, a desiccant or an inert gas is preferably added thereto to prevent the reduction of luminescence stability.

The antioxidant may be any arbitrary material by which the reduction of luminescence performance by air oxidation can be prevented, and examples thereof include commercial oxygen absorbers.

The desiccant may be any arbitrary material by which the reduction of luminescence performance by moisture absorption can be prevented, and examples thereof include silica gel, calcium chloride, aluminum oxide, dry soda etc.

The inert gas includes nitrogen, hydrogen, argon, carbon dioxide etc. The air in a head space (gaseous phase) in the container is replaced by the inert gas whereby the reduction of luminescence stability by the oxidation of the bioluminescent composition can be prevented.

Further, it is also important in the present invention that the components necessary for bioluminescence are stored under forcible cooling, and if the components are stored at room temperature, there is the problem of inevitable reduction of luminescence stability.

For forcible cooling, the components as such or after frozen in a refrigerator are stored (1) under cooling in a freezer or (2) with a cooling medium in a container made of a thermal insulation material.

The cooling medium may be an arbitrary medium with which the temperature in the container containing the bioluminescent composition can be kept at a low temperature, and examples thereof include dry ice, crushed ice or cooling materials (e.g. synthetic CMC, a gel cooling agent etc.)

If the bioluminescent composition is liquid, the liquid is frozen in a freezing compartment so that the composition can also act as a cooling medium.

The thermal insulation material used for producing the container includes a single material such as foamed styrol, foamed urethane, foamed polyethylene or rigid urethane foam, or a combination thereof with other materials such as aluminum, stainless steel, titanium, polyethylene, polypropylene, avinyl chloride steel plate, quilting etc.

The components are stored preferably under forcible cooling in this manner in order to maintain their luminescence stability.

BEST MODES FOR CARRYING OUT THE INVENTION

Figure 1:
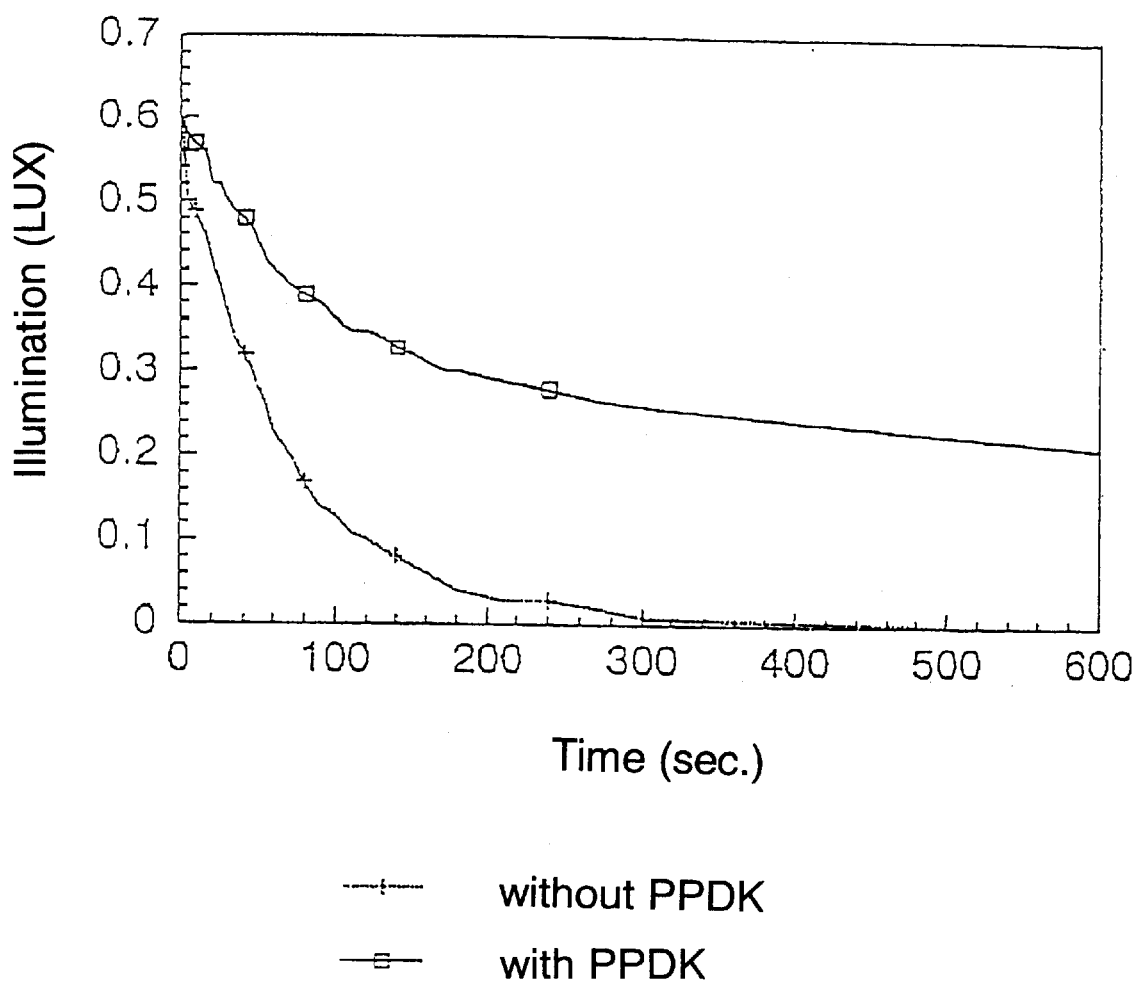
FIG. 1 is a graph showing a change with time in the luminescence of the luminescent plaything of the present invention.

Hereinafter, the present invention will be described in more detail by reference to the Examples, which, however, are not intended to limit the scope of the present invention.

EXAMPLE 1

(Preparation of Luminescent Plaything)

The following 6 components were dissolved at the predetermined concentrations in 50 ml of distilled water.

| Luciferin | 0.7 mM |
| --- | --- |
| Luciferase (Kikkoman Corporation) | 30 mg |
| Glycine-NaOH buffer (pH 7.5) | 0.2M |
| Sucrose (enzyme stabilizer) | 30 mM |
| ATP | 5.3 mM |
| EDTA (metal chelating agent) | 25 mM |

EXAMPLE 2
(Preparation of Luminescent Plaything)

The following powdery components were uniformly mixed to give a luminescent plaything.

| Luciferin | 0.1 g |
| --- | --- |
| Luciferase (Kikkoman Corporation) | 0.2 g |
| ATP | 5.0 g |
| Tris (hydroxymethyl)aminomethane (buffer agent) | 2.5 g |
| Sucrose (enzyme stabilizer) | 4.0 g |

EXAMPLE 3
(Luminescent Plaything: Illuminating plaything usable in sea for night fishing, and fish-gathering lamp usable in sea)

50 ml seawater was put in a 100-ml colorless transparent glass container, and when 1 g luminescent plaything (powder) obtained in Example 2 above was dissolved in seawater, the emission of a soft light with an indescribable vivid tone of color was initiated, and the emission gradually decayed, and even about 5 hours later, the emission could be confirmed.

This result shows that the luminescent plaything of the present invention is conveniently portable and achieves strong luminescence upon mere addition of seawater, and it is therefore utilizable preferably as various kinds of illumination, for example, illuminating plaything usable in sea for night fishing, fish-gathering lamps usable in sea.

EXAMPLE 4
(Preparation of Luminescent Plaything)

| Tris-succinic acid buffer solution | 0.15M |
| --- | --- |
| Luciferase (Kikkoman Corporation) | 0.3 mg |
| ATP | 8 mM |
| Luciferin | 3.6 mM |
| Dextrin (excipient) | 5 (W/V) % |
| Carboxymethyl cellulose (binder) | 2 (W/V) % |
| EDTA (metal chelating agent) | 25 mM |

The above components were dissolved in 100 ml of distilled water and the pH was adjusted to 7.5.

Because this solution does not contain a metal salt in an amount enough to satisfy the object as a luminescent plaything, luminescence hardly occurs actually.

A cellulose cube (5 mm square; CM-Celet®, Bio-Material Ltd.) was immersed in the above solution to achieve sufficient adsorption of the solution, followed by lyophilization thereof.

When seawater was added dropwise to the lyophilized cube (0.1 ml/cube), luminescence occurred rapidly, and was maintained over 2 hours.

For comparison, when distilled water was added dropwise to the lyophilized cube (0.1 ml/cube), luminescence hardly occurred.

EXAMPLE 5
(Preparation of Luminescent Plaything)

50 ml each of the following solutions A and B were separately put in 100-ml glass bottles, and each opening thereof was capped tightly whereby a luminescent plaything comprising a combination of solutions A and B was obtained.

(1) Solution A (pH 7.5) (50 ml)

The following 4 components were added and dissolved in distilled water at the predetermined concentrations to prepare solution A.

| Luciferin | 0.7 mM |
| --- | --- |
| Luciferase (Kikkoman Corporation) | 0.6 mg/ml |
| Glycine-NaOH buffer (pH 7.5) | 0.2M |
| Sucrose (enzyme stabilizer) | 30 mM |

(2) Solution B (pH 7.5) (50 ml)

The following 3 components were added and dissolved in distilled water at the predetermined concentrations to prepare solution B.

| ATP | 5.3 mM |
| --- | --- |
| Magnesium sulfate (metal salt) | 40 mM |
| Glycine-NaOH buffer (pH 7.5) | 0.2M |

EXAMPLE 6
(Preparation of Luminescent Plaything)

50 ml each of the following solutions A and B were separately put in 100-ml glass bottles, and each opening thereof was capped tightly whereby luminescent plaything comprising a combination solutions A and B was obtained.

(1) Solution A (pH 7.5) (50 ml)

The following 3 components were added and dissolved in distilled water at the predetermined concentrations to prepare solution A.

| Luciferase (Kikkoman Corporation) | 0.6 mg/ml |
| --- | --- |
| Glycine-NaOH buffer (pH 7.5) | 10 mM |
| Sucrose (enzyme stabilizer) | 10 mM |

(2) Solution B (pH 7.5) (50 ml)

The following 4 components were added and dissolved in distilled water at the predetermined concentrations to prepare solution B.

| Luciferin | 0.4 mM |
| --- | --- |
| ATP | 2.0 mM |
| Magnesium sulfate (metal salt) | 40 mM |
| Glycine-NaOH buffer (pH 7.5) | 30 mM |

EXAMPLE 7
(Preparation of Luminescent Plaything)

The following dry powder (components) were uniformly mixed to give a luminescent plaything.

| Luciferin | 0.1 g |
| --- | --- |
| Luciferase (Kikkoman Corporation) | 0.2 g |
| ATP | 5.0 g |

-continued

| | |
|---|---|
| Magnesium sulfate (metal salt) | 2.0 g |
| Tris(hydroxymethyl)aminomethane (buffer agent) | 2.5 g |
| Sucrose (enzyme stabilizer) | 4.0 g |

This luminescent plaything is characterized in that it does not emit a light in the dry state but emits a light immediately when dissolved in water.

EXAMPLE 8
(Luminescent Plaything: powder emitting upon addition of water)

1 g of the powdery luminescent plaything obtained in Example 7 was put in a 50-ml wine glass, and when 20 ml distilled water was poured into it, the emission of a light with a vivid tone of color was initiated, and this luminescence gradually decayed and, even about 10 hours later, the luminescence was confirmed.

This result shows that the luminescent plaything of the present invention is suitable as a luminescent plaything generating luminescence upon mere addition of water.

EXAMPLE 9
(Luminescent Plaything: Light on Ice)

A colorless and transparent champagne glass was filled with shaved ice, and 0.5 g of the powdery luminescent plaything prepared in Example 7 was scattered on it.

As the scattered luminescent plaything was gradually dissolved in surface water on the ice, the luminescence of the luminescent plaything was initiated, and as the ice was melted, the whole of the luminescent plaything was gradually dissolved, and luminescence lasted.

The luminescence from this luminescent plaything lasted at room temperature for about 2 hours until the ice was completely melted and for about 3 hours or more even after it became in a liquid state.

From this result, it was found that the luminescent plaything of the present invention can be utilized as a light decorative ornament on ice emitting an elegant light enjoyable for an adequate time, e.g., during a meal on a table in a restaurant.

EXAMPLE 10
(Luminescent Plaything: Light on Ice)

An ice pillar with alive flowers frozen inside it was provided with a stepped cut on the surface, and 3 g of the luminescent plaything prepared in Example 7 was scattered on the stepped cut.

Luminescence occurred from the place where the luminescent plaything was dissolved in surface water on ice, and as the ice was dissolved, the luminescence gradually became spread over the whole surface of ice.

The luminescence of this luminescent plaything lasted for about 6 hours or more until the ice was completely dissolved.

From this, it was found that the luminescent plaything of the present invention is satisfactorily enjoyable as a light decorative ornament on ice emitting an elegant light in e.g. a party hall.

EXAMPLE 11
(Luminescent Plaything: Light on Ice)

20 g of the luminescent plaything prepared in Example 7 was scattered on a snow face in a skiing slope in a skiing ground.

The luminescence of the luminescent plaything gradually initiated from the place where it was dissolved in surface water on snow, and the luminescence lasted for about 12 hours or more.

From the foregoing, it was found that the luminescent plaything of the present invention is utilizable preferably as a light on ice in place of illumination at night in a skiing slope in a skiing ground.

As can be seen from the results in Examples 8 to 11 above, the powdery luminescent plaything prepared according to the present invention can be utilized as a light on ice, which is scattered on the surface of ice such as a block of ice, ice on a plate, rock ice, crushed ice, ice cube, shaved ice, snow, snow images, ice images, ice pillars, buildings and skating rinks made of ice, a skiing slope in a skiing ground, the slope of a snow-covered mountain, whereby luminescence occurs beautifully on the surface of the ice or therearound.

EXAMPLE 12
(Luminescent Plaything: Light on Ice)

An art object made of snow was scattered partially with 20 g of the luminescent plaything prepared in Example 7. The luminescence of the luminescent plaything gradually occurred from the place where it was dissolved in surface water on ice, and the luminescence lasted for 12 hours or more.

From the foregoing, it was found that the luminescent plaything of the present invention can be used as a light on ice for raising visual artistic effects in a snow festival, an ice sculpture exhibition, etc.

EXAMPLE 13
(Luminescent Plaything: Candle for a Candlelight Service in a Wedding Reception)

Solution A as the luminescent plaything obtained in Example 5 was put in a 200-ml colorless and transparent wine glass, and when solution B was poured into it, the emission of a soft light with an indescribable vivid tone of color was immediately initiated, and this luminescence gradually decayed, and even about 10 hours later, the luminescence could be confirmed.

From this result, it was found that the luminescent plaything of the present invention is suitable as an ornament in place of a candle used in a candlelight service where the bride and groom light a candle in each table for invited guests.

EXAMPLE 14
(Luminescent Plaything: Table Light)

Solution A as the luminescent plaything obtained in Example 6 was put in a 100-ml white semitransparent glass container in the shape of a spiral ornamental candle, and when solution B was poured into it, the emission of a soft light with an indescribable vivid tone of color was immediately initiated, and this luminescence gradually decayed, and even about 5 hours later, the luminescence could be confirmed.

From this result, it was found that the luminescent plaything of the present invention is suitable as a table light for lighting effects in an atmosphere under which foods and drinks are served in a restaurant or a coffee bar with dropped illumination.

EXAMPLE 15
(Luminescent Plaything: Fish-gathering Lamp Usable in Sea)

The powdery luminescent plaything of the present invention obtained in Example 7 was formed into solid matter (tabletted) in a tabletting machine, and 1 g of the tablets were introduced into the opening of Teila for squid fishing (i.e., a transparent, long and narrow tube in the form of a bag connected to a hook), and the opening was thermally melt and sealed to prepare a fish-gathering lamp.

The portion of this luminescent plaything in the fish-gathering lamp was provided with a small hole by penetrating a hook therethrough so as to permit water gradually to permeate through said hole. It was found that when hanged in seawater, the luminescent plaything immediately emitted a vivid yellowish green light whereby the hook and its surrounding could be kept bright for about 3 hours.

EXAMPLE 16
(Luminescent Plaything: Illuminating Plaything for Camp, illuminating plaything for night fishing, and fish-gathering lamp)

50 ml of distilled water was put in a 100-ml colorless transparent wine glass, and 1 g of the luminescent plaything (powder) obtained in Example 7 above was dissolved therein whereby the emission of a soft light with an indescribable tone of color not obtainable from flames of conventional candles was initiated, and this luminescence gradually decayed, and even about 5 hours later, the luminescence could be confirmed.

From this result, it was found that because the powdery luminescent plaything of the present invention is conveniently portable and achieves strong luminescence upon mere addition of water, it can be preferably utilized as various kinds of illumination, for example an illumination plaything for camp, an illumination plaything for night fishing, and a fish-gathering lamp.

EXAMPLE 17
(Luminescent Plaything: Fish-gathering Lamp)

The powdery luminescent plaything of the present invention obtained in Example 7 was formed into solid matter (tabletted) in a tabletting machine, and 0.1 g of the tablets were introduced into a hollow part in a lure (Takobate) (i.e., long, narrow, colorless and transparent cap-shaped container (inner diameter, about 3 mm; length, 50 mm) made of synthetic resin having an approximately conical top and an opening end, which is shaped into an cuttlefish or an octopus by cutting a surrounding wall of its end portion (length, 30 mm) into shreds (brush-shaped)), and the opening was thermally melt and sealed to prepare a fish-gathering lamp.

The portion of this luminescent plaything in the fish-gathering lamp was provided with a small hole by penetrating a hook therethrough. It was found that when hanged in seawater and tap water, the luminescent plaything immediately emitted a vivid yellowish green light whereby the lure itself emitted a light brightly for 1 hour.

EXAMPLE 18
(Luminescent Plaything: Fish-gathering Lamp)

5 g of the powder luminescent plaything of the present invention obtained in Example 7 was mixed with 100 g sardine minced meat (chum) to prepare a fish-gathering lamp also serving as chum.

Immediately after this fish-gathering lamp was prepared, it was introduced into seawater or tap water, the chum was dispersed in water, and simultaneously the chum and its surrounding emitted a vivid yellowish green light whereby the chum and its surrounding could be kept bright.

EXAMPLE 19
(Luminescent Plaything: Fish-gathering Lamp)

The powdery luminescent plaything of the present invention obtained in Example 7 was formed into solid matter (tabletted) in a tabletting machine, and 1 g of the tablets were introduced into the opening of Teila for squid fishing (i.e., a transparent, long and narrow tube in the form of a bag connected to a hook), and the opening was thermally melt and sealed to prepare a fish-gathering lamp.

The portion of this luminescent plaything in the fish-gathering lamp was provided with a small hole by penetrating a hook therethrough so as to permit water gradually to permeate into that portion. It was found that when hanged in seawater or tap water, the luminescent plaything immediately emitted a vivid yellowish green light whereby the hook and its surrounding could be kept bright for about 3 hours.

EXAMPLE 20
(Luminescent Plaything: Illumination Plaything for Night Fishing)

1 g of the powdery luminescent plaything of the present invention obtained in Example 7 was introduced into a transparent plastic straw, and both the ends were sealed to prepare the illumination plaything of the present invention for night fishing.

This plaything was provided with a small hole such that water could gradually permeated into it. The plaything was connected to the middle of a fishing line joining a fishing rod and a sinker. It was found that when introduced into seawater, the plaything which owing to the weight of the sinker, was kept on or just below the surface of the sea emitted a vivid yellowish green light immediately, so it was utilizable as "a float" for night fishing.

EXAMPLE 21
(Preparation of Luminescent Plaything)

50 ml each of the following solutions A and B were separately introduced into 100-ml glass bottles, and each opening thereof was capped tightly whereby a luminescent plaything comprising a combination of solutions A and B was obtained.

(1) Solution A (pH 7.5)

The following 3 components were added and dissolved in distilled water at the predetermined concentrations to prepare solution A.

| | |
|---|---|
| Luciferase (Kikkoman Corporation) | 30 mg |
| Glycine-NaOH buffer (pH 7.5) | 0.2M |
| Sucrose (enzyme stabilizer) | 30 mM |

(2) Solution B (pH 7.5)

The following 5 components were added and dissolved in distilled water at the predetermined concentrations to prepare solution B.

| | |
|---|---|
| 2-Cyano-6-methoxybenzothiazole (luciferin precursor) | 0.7 mM |
| ATP | 5.3 mM |
| Magnesium sulfate (metal salt) | 40 mM |
| Glycine-NaOH buffer (pH 7.5) | 0.2M |
| D-cysteine (luciferin precursor) | 0.7 mM |

EXAMPLE 22
(Luminescent Plaything: Safety Candle)

Solution A obtained in Example 21 was first put in a 200-ml colorless transparent liqueur glass (i.e., a long and narrow glass) and then solution B was poured into it, whereby the emission of a soft light with an indescribable vivid tone of color was immediately initiated, and this luminescence gradually decayed, and even about 5 hours later, the luminescence could be confirmed.

From this result, it was found that the luminescent plaything of the present invention can be utilized preferably for a ceremony in a family Buddhist altar or in a graveyard as a safety candle capable of getting rid of anxiety about fire.

EXAMPLE 23
(Luminescent Plaything: Preparation of Luminescent Writing Implement)

A luminescent writing implement consisting of the luminescent base ink and the luminescent ink ancillary set forth below was prepared.

1) The following 6 components were added and dissolved in distilled water at the predetermined concentrations to prepare a luminescent base ink.

| | |
|---|---|
| Luciferin | 0.7 mM |
| Luciferase | 30 mg |
| Glycine-NaOH buffer solution (pH 7.5) | 0.2M |
| Sucrose | 30 mM |
| ATP | 5.3 mM |
| EDTA (metal chelating agent) | 25 mM |

2) Separately, an luminescent ink ancillary consisting of 50 mM magnesium sulfate solution (pH 7.5) was prepared.

EXAMPLE 24
(Example of Use of the Luminescent Writing Instrument)

The luminescent ink ancillary prepared in Example 23 was introduced into a sprayer, then sprayed onto a filter paper and air-dried. Then, a writing brush used in calligraphy was impregnated with the luminescent base ink prepared in Example 23, and used to write letters on the filter paper whereby bright letters emitting an indescribable vivid light were obtained. The letters disappeared when dried, but when the paper was moistened with water sprayed from a sprayer, the emission of the light was initiated again. It was confirmed that the luminescence could be repeatedly enjoyed similarly thereafter.

Separately, the luminescent base ink prepared in Example 23 was introduced into a sprayer, then sprayed onto a filter paper and air-dried. Then, a writing brush used in calligraphy was impregnated with the luminescent ink ancillary prepared in Example 23, and used to write letters on the filter paper whereby bright letters emitting a light were obtained similarly.

As can be seen from this result, the luminescent writing implement of the present invention can produce desired luminescent letters, luminescent figures, luminescent drawings etc. on various carriers (e.g., paper, woven fabric, nonwoven fabric, wood, etc.).

EXAMPLE 25

A luminescence-aiding ancillary material of 2 cm×2 cm×1.5 cm consisting of colorless and transparent rock ice made of plastics having an irregular gloss surface was obtained.

EXAMPLE 26

A luminescence-aiding material consisting of a small mass with an outer diameter of about 2 cm having innumerable irregular gloss surfaces was obtained by crumpling aluminum foil (metal foil) of 20 cm×24 cm.

EXAMPLE 27

A luminescence-aiding material was obtained by crumpling a pearl gray and glossy film of 10 cm×10 cm.

EXAMPLE 28

A luminescence-aiding material in the form of a screw ribbon (i.e., a long and narrow spiral stick) having a gloss surface was obtained by twisting the ends of a belt-shaped aluminum foil of 1.5 cm×10 cm by hand.

EXAMPLE 29
(1) Preparation of Luminescent Reagents 100 ml each of solutions A and B having the following compositions were prepared.

1) Solution A (pH 7.5) (100 ml)

The following 4 components were added and dissolved in distilled water at the predetermined concentrations to prepare solution A.

| | |
|---|---|
| Luciferin | 0.7 mM |
| Luciferase (Kikkoman Corporation) | 6 mg |
| Glycine-NaOH buffer (pH 7.5) | 0.2M |
| Sucrose (enzyme stabilizer) | 30 mM |

2) Solution B (pH 7.5) (100 ml)

The following 3 components were added and dissolved in distilled water at the predetermined concentrations to prepare solution B.

| | |
|---|---|
| ATP | 5.3 mM |
| Magnesium sulfate (metal salt) | 40 mM |
| Glycine-NaOH buffer (pH 7.5) | 0.2M |

(2) Preparation of Bioluminescent Liquid, and Example of Luminescence Using the Luminescence-aiding Material 22.5 ml each of the luminescent reagents (solutions A and B) were simultaneously poured into a 80-ml wine glass to prepare a bioluminescent liquid.

Seven pieces of the plastic rock ice (as a luminescence-aiding material) obtained in Example 25 were placed (or fixed) in this bioluminescent liquid, and the luminescence was observed.

The glass had been filled with the luminescent liquid.

The amount of each luminescent liquid necessary to fill the wine glass was 37.5 ml when the rock ice was not used, and this amount of the luminescent liquid could be reduced by using the rock ice.

Furthermore, it was confirmed that when the rock ice was fixed in the liquid emitting bioluminescence, the luminescence was emitted irregularly thereby increasing the glitter and further increasing the beauty as compared with that of the bioluminescent liquid without the rock ice. It was also found that the attractive luminescent plaything could be obtained by fixing the rock ice even in a small amount the bioluminescent liquid.

EXAMPLE 30

22.5 ml each of the luminescent reagents (solutions A and B) obtained in Example 29 were simultaneously poured into a 80-ml liqueur glass to prepare a bioluminescent liquid.

Eight small masses (which serve as a luminescence-aiding material) with an outer diameter of about 2 cm having innumerable irregular gloss surfaces obtained by crumpling aluminum foil in Example 26 were placed (or fixed) in the bioluminescent liquid, and its luminescence was observed.

As a result, it was confirmed that when the small masses of aluminum foil were fixed in the liquid emitting bioluminescence, the luminescence was emitted irregularly thereby increasing the glitter and further increasing the beauty as compared with that of the bioluminescent liquid free of the small masses.

EXAMPLE 31

22.5 ml each of the luminescent reagents (solutions A and B) obtained in Example 29 were simultaneously poured into a 80-ml liqueur glass to prepare a bioluminescent liquid.

The luminescence-aiding material obtained by crumpling a pearl gray and glossy film in Example 27 was placed (or fixed) in the bioluminescent liquid, and its luminescence was observed.

As a result, it was confirmed that the luminescence was emitted irregularly thereby increasing the glitter and further increasing the beauty as compared with that of the bioluminescent liquid free of the luminescence-aiding material.

The luminescent liquid shining surpassingly well by providing this luminescence-aiding material therein, and the clear and beautiful change of luminescence could be confirmed, and the luminescence was thereby made further amazing. The charm of the luminescent plaything previously developed by the applicant could be improved.

EXAMPLE 32

30 ml each of the luminescent reagents (solutions A and B) obtained in Example 29 were poured simultaneously into a 100-ml wide-mouthed campaign glass to prepare a bioluminescent liquid.

A floating candle (i.e., a small candle which is floated on water when used) was floated on (or fixed in) the bioluminescent liquid, and when the candle was lighted, the luminescence of the luminescent plaything was mixed with the light of the candle to bring about a visual effect with a certain atmosphere. Thus, the charm of the luminescent plaything could be improved by use of the luminescence-aiding material.

EXAMPLE 33
Preparation Example of Luminescent Plaything Suitable for Candlelight Service in Wedding Receptions (1) Solution A (pH 7.5) (50 ml)

The following 4 components were added and dissolved in distilled water at the predetermined concentrations to prepare solution A.

| Luciferin | 0.7 mM |
|---|---|
| Luciferase (Kikkoman Corporation) | 0.6 mg/ml |
| Glycine-NaOH buffer (pH 7.5) | 0.2M |
| Sucrose (enzyme stabilizer) | 30 mM |

(2) Solution B (pH 7.5) (50 ml)

The following 3 components were added and dissolved in distilled water at the predetermined concentrations to prepare solution B.

| ATP | 5.3 mM |
|---|---|
| Magnesium sulfate | 40 mM |
| Glycine-NaOH buffer (pH 7.5) | 0.2M |

Edible blue No. 1 (Tokyo Kasei Kogyo K. K.) dissolved at a concentration of 0.01 (W/V) % in solution A above was poured into a 200-ml colorless transparent wine glass. Then, solution B was poured into the glass whereby the emission of a vivid bluish green light was immediately initiated.

EXAMPLE 34
Preparation Example of Luminescent Plaything Suitable as Table Light:

Coloring matter BV14 MAGENTA pdr (Daimatsu Sangyo K. K.) dissolved at a concentration of 0.004 (W/V) % in solution A prepared in Example 33 above was poured into a 200-ml colorless transparent wine glass. Then, when solution B was poured into the glass, the emission of a vivid orange light was immediately initiated.

Furthermore, it was found that by varying the amount (or concentration) of the coloring matter, the color of the light can be changed to an intermediate color between orange and red or to an intermediate color between orange and yellow.

EXAMPLE 35
Preparation Example of Luminescent Plaything Suitable for Party:

Suminol Milling Green G (Sumitomo Chemical Co., Ltd.) dissolved at a concentration of 0.005 (W/V) % in solution A prepared in Example 33 above was poured into a 200-ml colorless transparent wine glass. Then, when solution B was poured into the glass, the emission of a vivid pale yellowish green light was immediately initiated.

EXAMPLE 36
Preparation Example of Luminescent Plaything Suitable as Fish-gathering Lamp:

| Tris-succinate buffer | 0.15M |
|---|---|
| Luciferase (Kikkoman Corporation) | 0.3 mg |
| ATP | 8 mM |
| Luciferin | 3.6 mM |
| Dextrin (excipient) | 5 (W/V) % |
| Carboxymethyl cellulose (binder) | 2 (W/V) % |
| EDTA (metal chelating agent) | 25 mM |
| Edible blue No. 1 (coloring matter, Tokyo Kasei Kogyo) | 10 mg |

These components were dissolved in 100 ml distilled water, and the solution was adjusted to pH 7.5.

This solution does not contain a metal salt in an amount enough to satisfy the object as a luminescent plaything, and actually luminescence hardly occurs.

A cellulose cube 1 cm square (Microcube®, Bio-Material Ltd.) was immersed in this solution for sufficient adsorption of the solution, followed by lyophilization thereof. Magnesium sulfate was sprayed onto this cellulose cube, then 0.1 ml water added thereto, whereby it emitted a vivid green light.

EXAMPLE 37
Preparation Example of Luminescent Plaything Preferable as Bioluminescent Illumination

| Tris-succinate buffer | 0.15M |
|---|---|
| Luciferase (Kikkoman Corporation) | 0.3 mg |
| ATP | 8 mM |
| Luciferin | 3.6 mM |
| Dextrin (excipient) | 5 (W/V) % |
| Carboxymethyl cellulose (binder) | 2 (W/V) % |
| EDTA (metal chelating agent) | 25 mM |

These components were dissolved in 100 ml distilled water, and the solution was adjusted to pH 7.5. This solution was designated solution YE.

Solution YE was divided into 4 groups to prepare the following 4 luminescent reagent solutions: The first group contained no coloring matter and used as such (referred to as solution YE which is colorless and transparent); the second group contained 0.01 (W/V) % edible blue No. 1 (Tokyo Kasei Kogyo K. K.) (referred to as solution BL which is pale blue); the third group contained 0.004 (W/V) % BV14 MAGENTA pdr (Daimatsu Sangyo K. K.) (referred to as solution RE which is pale red); and the fourth group contained 0.05 (W/V) % Suminol Milling Green G (Sumitomo Chemical Co., Ltd.) (referred to as solution GR which is pale green).

Clothes were immersed in solutions YE, BL, RE, and GR for sufficient absorption of the solutions, followed by lyophilization thereof. These lyophilized clothes were used to prepare silk flowers which are artificial flowers. Upon absorption of water containing magnesium, the silk flowers emitted a yellow light, a bluish green light, an orange light and a pale yellowish green light respectively, and the novel luminescent plaything could thus be obtained.

EXAMPLE 38

Preparation of Bioluminescent Composition Liquid 100 ml of solution A containing luciferin and luciferase and 100 ml of solution B containing ATP and a metal salt, as follows, were introduced respectively into 120-ml long and narrow brown glass bottles (which are light- and gas-impermeable containers), and their openings were closed tightly with rubber caps.

(1) Solution A (pH 7.5) (amount per 100 ml)

The following 4 components were added and dissolved in distilled water at the predetermined concentrations to prepare solution A.

| | |
|---|---|
| Luciferin | 0.7 mM |
| Luciferase (Kikkoman Corporation) | 6 mg |
| Glycine-NaOH buffer (pH 7.5) | 0.2M |
| Sucrose (enzyme stabilizer) | 30 mM |

(2) Solution B (pH 7.5) (amount per 100 ml)

The following 3 components were added and dissolved in distilled water at the predetermined concentrations to prepare solution B.

| | |
|---|---|
| ATP | 5.3 mM |
| Magnesium sulfate (metal salt) | 40 mM |
| Glycine-NaOH buffer (pH 7.5) | 0.2M |

EXAMPLE 39

For comparison, control bioluminescent composition solutions i.e. solutions A and B were obtained in the same manner as in Example 38 except that a "colorless transparent glass bottle" was used in place of a "brown glass bottle".

The bioluminescent composition solutions (solutions A and B) obtained in Examples 38, and the control solutions, were left respectively for 3 days at a bright window through which the direct rays of the sun did not stream in under fine weather.

Then, 50 ml of the bioluminescent composition liquid (solution A) of the present invention previously placed in the brown glass bottle was poured into a 200-ml colorless transparent wine glass, and subsequently 50 ml of solution B was poured into the glass, whereby the emission of a soft light with an indescribable vivid tone of color was immediately initiated, and it was confirmed that this luminescence was in no way inferior to that of the bioluminescent composition liquid before left in the bright room.

By contrast, 50 ml of the control bioluminescent composition liquid (solution A) previously placed in the colorless transparent bottle was poured into a 200-ml colorless transparent wine glass, and then 50 ml solution B was poured into the glass, whereby the emission of a light was similarly initiated, but it was surely confirmed that this luminescence was somewhat darker than that of the bioluminescent composition liquid before left in the bright room.

As can be seen from this result, the problem of the bioluminescent composition is that the bioluminescent composition is poor in light stability, and its luminescence stability is impaired in a relatively short period. However, the reduction of the luminescence stability by transmitted light can be prevented by introducing the composition into a light- and gas-impermeable container.

EXAMPLE 40

The bottles containing solutions A and B prepared in Example 38 above were accommodated together in a thermos bottle made of stainless steel, and crushed ice was packed in the space between the outer peripheral wall and the internal peripheral wall of the thermos bottle, and the 2 bottles were stored under forcible cooling therein.

EXAMPLE 41

500 ml each of solutions A and B prepared in Example 38 were put separately into 500-ml colorless transparent plastic rectangular bottles (with caps), and after the openings were capped tightly, the whole of the respective bottles were covered with aluminum foil, and solutions A and B were packaged under light shielding.

Then, the rectangular bottles were placed in the freezing compartment in a refrigerator, whereby solutions A and B were frozen and stored as such for half a year.

The respective rectangular bottles containing the frozen solutions A and B were removed from the refrigerator, and solutions A and B were thawed at room temperature.

50 ml of the thawed solution A was first put in a 200-ml colorless transparent wine glass, then 50 ml solution B was poured into it. Immediately the emission of a soft light with an indescribable vivid color tone was initiated, and it was confirmed that this luminescence was in no way inferior to that of the bioluminescent composition liquid before storage.

EXAMPLE 42

The following powdery luciferin, luciferase, ATP and a metal salt were uniformly mixed to prepare a bioluminescent composition.

This composition was put in a film bag container made of a film having a metal film laminated on a synthetic resin film. Following degassing, the opening of the bag was heat-sealed.

Then, this film bag container along with a gel cooling agent was placed in a cooler box made of polypropylene, and the inside of the box was forcibly cooled with the gel cooling agent.

(Content of the Bioluminescent Composition)

| | |
|---|---|
| Luciferin | 0.1 g |
| Luciferase (Kikkoman Corporation) | 0.2 g |
| ATP | 5.0 g |
| Magnesium sulfate (metal salt) | 2.0 g |
| Tris(hydroxymethyl)aminomethane (buffer agent) | 2.5 g |
| Sucrose (enzyme stabilizer) | 4.0 g |

EXAMPLE 43

A bioluminescent composition having the same composition as in Example 42 was uniformly mixed and formed in a tabletting machine into tablets (diameter×thickness/10 mm×2 mm) which were then placed in a glass brown bottle, and the air in the head space was replaced by a nitrogen gas, then the bottle was capped tightly with a rubber cap. This bottle was stored in a refrigerator at 4° C. for half a year.

This bioluminescent composition (tablets) which had been stored for half a year was removed from the refrigerator, the cap was removed, and the tablets were put in a 200-ml colorless transparent wine glass. When 100 ml distilled water was poured into the glass, the tablets immediately initiated to emit a soft light with an indescribable vivid color tone, and it was confirmed that this luminescence was in no way inferior to that of the tablets before storage.

EXAMPLE 44

50 ml solution A and 50 ml solution B below were separately put in 100-ml glass bottles, and the openings of the bottles were capped tightly to give a luminescent plaything comprising a combination of solutions A and B.

(1) Solution A (pH 7.5)

The following components were added and dissolved in distilled water at the predetermined concentrations to prepare solution A.

| | |
|---|---|
| Pyruvate orthophosphate dikinase (PPDK) | 1.0 U/ml |
| Luciferase | 30 mg |
| Glycine (buffer agent) | 0.2M |
| Sucrose (enzyme stabilizer) | 30 mM |

(2) Solution B (pH 7.5)

The following components were added and dissolved in distilled water at the predetermined concentrations to prepare solution B.

| | |
|---|---|
| Glycine (buffer agent) | 0.2M |
| Magnesium sulfate (metal salt) | 40 mM |
| ATP | 25 µM |
| Luciferin | 0.7 mM |
| Ammonium sulfate | 7.5 mM |
| Phosphoenolpyruvic acid | 4.2 mM |
| Sodium pyrophosphate | 200 µM |

Of the above components, ammonium sulfate was used for enhancing the activation of pyruvate orthophosphate dikinase; sucrose for stabilizing luciferase; and glycine for stabilizing the pH of the reaction system.

EXAMPLE 45

One ml of solution A obtained in Example 44 was put in a plastic test tube, and 1 ml of solution B was added thereto. Immediately the tube was set in a dark box to measure for illumination levels with time on the illuminometer (Tokyo Glass Kikai K. K.) Digital Lux Meter Model FLX-1330 (Tokyo Glass Kikai K. K.).

For comparison, illumination was measured with time in the same manner as above except that the following "control solution", 1 ml, was used in place of 1 ml of "solution A".

The results are shown in FIG. 1.

(Preparation of the Control Solution, pH 7.5)

The following components were added and dissolved in distilled water at the predetermined concentrations to prepare the control solution. This solution is identical to solution A except that it does not contain PPDK.

| | |
|---|---|
| Luciferase | 30 mg |
| Glycine (buffer agent) | 0.2M |
| Sucrose (enzyme stabilizer) | 30 mM |

The results shown in FIG. 1, shows that if solution A (containing PPDK) is mixed with solution B, the luminescence lasts without rapidly decaying due to the effect of PPDK on ATP cycling, whereas if the control solution (containing no PPDK) is mixed with solution B, ATP is consumed by luciferase and the luminescence decays for only 5 minutes.

EXAMPLE 46

Preparation of Luminescent Plaything:

The following powdery components were mixed uniformly to give a luminescent plaything.

| | |
|---|---|
| Pyruvate orthophosphate dikinase | 100 mg |
| Phosphoenolpyruvic acid | 500 mg |
| Sodium pyrophosphate | 9 mg |
| Luciferin | 100 mg |
| Luciferase (Kikkoman Corporation) | 650 mg |
| ATP | 16 mg |
| $K_2HPO_4$ (buffer agent) | 1.4 g |
| $KH_2PO_4$ (buffer agent) | 8.7 g |
| Magnesium sulfate (metal salt) | 5.3 g |
| Sucrose (enzyme stabilizer) | 5.4 g |
| Ammonium sulfate (activator for PPDK) | 500 mg |

EXAMPLE 47

Preparation of Luminescent Plaything Emitting Yellow Light:

The powdery components were mixed uniformly in the following compounding proportion and formed in a tabletting machine into disk-shaped tablets of a luminescent plaything (about 100 mg) with a diameter of 10 mm and a thickness of 1 mm.

(Compounding Proportion)

| | |
|---|---|
| Luciferin | 0.1 g |
| Luciferase emitting yellow light (Kikkoman Corporation) | 0.2 g |
| ATP | 5.0 g |
| Magnesium sulfate (metal salt) | 2.0 g |
| Tris(hydroxymethyl)aminomethane (buffer agent) | 2.5 g |
| Sucrose (enzyme stabilizer) | 4.0 g |

EXAMPLE 48

Preparation of Luminescent Plaything Emitting Red Light:

The powdery components were mixed uniformly in the following compounding proportion and formed in a tabletting machine into disk-shaped tablets of a luminescent plaything (about 100 mg/tablet) with a diameter of 10 mm and a thickness of 1 mm.

(Compounding Proportion)

| Luciferin | 0.1 g |
| --- | --- |
| Luciferase emitting red light (Kikkoman Corporation) | 0.2 g |
| ATP | 5.0 g |
| Magnesium sulfate (metal salt) | 2.0 g |
| Tris(hydroxymethyl)aminomethane (buffer agent) | 2.5 g |
| Sucrose (enzyme stabilizer) | 3.0 g |
| Carboxymethyl cellulose (binder) | 5.0 g |

EXAMPLE 49

Preparation of Luminescent Plaything Emitting Orange Light:

The powdery components were mixed uniformly in the following compounding proportion and formed in a tabletting machine into disk-shaped tablets of a luminescent plaything (about 100 mg/tablet) with a diameter of 10 mm and a thickness of 1 mm.

(Compounding Proportion)

| Luciferin | 0.1 g |
| --- | --- |
| Luciferase emitting orange | 0.2 g |
| ATP | 5.0 g |
| Magnesium sulfate (metal salt) | 2.0 g |
| Tris(hydroxymethyl)aminomethane (buffer agent) | 2.5 g |
| Sucrose (enzyme stabilizer) | 3.0 g |
| Carboxymethyl cellulose (binder) | 5.0 g |

EXAMPLE 50

Preparation of Luminescent Plaything Emitting Eights with 3 Colors of Yellow, Red, and Orange in a Mosaic Pattern;

(1) Preparation of Luciferase Particles

Luciferase and sucrose were mixed uniformly in the following compounding proportion and formed in a tabletting machine into disk-shaped tablets with a diameter of 2 mm and a thickness of 1 mm, emitting yellow, red or orange light.

| (A) Luciferase particles emitting yellow light | |
| --- | --- |
| Luciferase emitting yellow light (Kikkoman Corporation) | 0.2 g |
| Dextrin (excipient) | 0.2 g |
| (B) Luciferase particles emitting red light | |
| Luciferase emitting red light (Kikkoman Corporation) | 0.2 g |
| Dextrin (excipient) | 0.2 g |
| (C) Luciferase particles emitting orange light | |
| Luciferase emitting orange light (Kikkoman Corporation) | 0.2 g |
| Dextrin (excipient) | 0.2 g |

(2) Preparation of luminescent plaything emitting lights with 3 colors of yellow, red, and orange in a mosaic pattern.

The three types of the luciferase particles (A), (B) and (C) emitting lights with different colors and the following powdery components were mixed uniformly in the following compounding proportion and formed in a tabletting machine into disk-shaped tablets with a diameter of 20 mm and a thickness of 2 mm.

(Compounding Proportion)

| Luciferin | 1.0 g |
| --- | --- |
| (A) Luciferase particles emitting yellow light | 7.0 g |
| (B) Luciferase particles emitting red light | 7.0 g |
| (C) Luciferase particles emitting orange light | 7.0 g |
| ATP | 50.0 g |
| Magnesium sulfate (metal salt) | 20.0 g |
| Tris(hydroxymethyl)aminomethane (buffer agent) | 25.0 g |
| Carboxymethyl cellulose (binder) | 50.0 g |

EXAMPLE 51

One tablet of the luminescent plaything obtained in Example 47 above was dropped into a colorless and transparent wine glass containing about 50 ml of water (corresponding to about half of the glass) whereby the disk-shaped luminous body shining in the transparent water was obtained, and its luminescence lasted for a while even after the tablet was dissolved.

For comparison, the respective powdery components in Example 47 were uniformly mixed without being granulated, and when 100 mg of the mixture was placed in a colorless and transparent wine glass containing about 50 ml water (corresponding to about half of the glass), the whole of the liquid immediately emitted a light.

This result shows that when the luminescent plaything is in the form of powder, the shape of the luminous body is defined by the shape of the container, but the tablet-shaped luminous body can be obtained according to the present invention, and its luminescence will continue for a while even after the tablet is dissolved.

EXAMPLE 52

The luminescent plaything in the form of tablets obtained in Example 47 were arranged in the form of a letter on a dry cotton cloth, and a transparent mesh cloth was placed thereon to fix the letter. The back of the cotton cloth was moistened with water by spraying whereby the water gradually permeated all the tablets to cause luminescence, and the luminescence in the form of the letter continued for about 3 hours or more.

EXAMPLE 53

Ten pieces each of the yellow, red and orange lights-emitting playthings obtained respectively in Examples 47, 48 and 49 above, i.e., 30 pieces of playthings in total, were uniformly mixed and piled on a glass small dish. Its surface was intermittently sprayed with water whereby the surface immediately initiated to emit lights. It was found that the lights having 3 colors of yellow, red and orange were emitted with a good balance in a mosaic form, shining like a mirror ball. The emission of the lights lasted, so it could be used satisfactorily as a mood lamp.

EXAMPLE 54

One piece of the luminescent plaything obtained in Example 50 above was dropped into a colorless transparent wine glass containing about 50 ml water (corresponding to about half of the glass) whereby the disk-shaped luminous body emitting lights having 3 colors of yellow, red and orange with a good balance in a mosaic form in the transparent water was obtained.

EXAMPLE 55
Preparation of Luminescent Plaything:

| | |
|---|---|
| Tris-succinate buffer | 0.15 M |
| Luciferase (Kikkoman Corporation) | 0.3 mg |
| ATP | 8 mM |
| Luciferin | 3.6 mM |
| Dextrin (fillers) | 5 (W/V) % |
| EDTA (metal chelating agent) | 25 mM |

These components were dissolved in distilled water, and the solution was adjusted to pH 7.5.

This solution does not contain a metal salt in an amount enough to satisfy the object as a luminescent plaything, and actually, luminescence hardly occurs.

A cellulose cube 1 cm square (Microcube®, Bio-Material Ltd.) was immersed in this solution for sufficient adsorption of the solution. Carboxymethyl cellulose powder was sprayed onto the surface of the cellulose cube and swelled by absorbing water, followed by lyophilization, to obtain a luminescent plaything topically emitting a light in seawater.

For comparison, a control luminescent plaything was prepared in the same manner as above except that lyophilization was conducted without spraying carboxymethyl cellulose powder.

It was found that when the cube of the invention and the control cube were immersed in seawater in a water tank, the control luminescent plaything immediately initiated luminescence, but the elution of the luminescent components into seawater also occurred to cause scattering of the luminescence and to reduce the duration of the luminescence.

By contrast, the luminescent plaything of the present invention gradually initiated luminescence, and the elution of the luminescent components hardly occurred, and the strong luminescence continued topically.

EXAMPLE 56
Preparation of Luminescent Bait for Fishing:

| | |
|---|---|
| Tris-succinate buffer | 0.15 M |
| Luciferase (Kikkoman Corporation) | 0.3 mg |
| ATP | 8 mM |
| Luciferin | 3.6 mM |
| Dextrin (fillers) | 5 (W/W) % |
| EDTA (metal chelating agent) | 25 mM |

These components were dissolved in 100 ml distilled water, and the solution was adjusted to pH 7.5.

This solution does not contain a metal salt in an amount enough to satisfy the object as a luminescent plaything, and actually luminescence hardly occurs.

Cellulose cubes 1 cm square (Microcube®, Bio-Material Ltd.) were immersed in this solution to sufficiently adsorb the solution, followed by lyophilization.

The cubes were divided into 3 groups: the first group was immersed in 0.5% (W/W) carboxymethyl cellulose solution; the second group in 1.5% (W/W) carboxymethyl cellulose solution; and the third group in 2.5% (W/W) carboxymethyl cellulose solution, after which these groups were lyophilized again.

It was found that when these 3 kinds of cellulose cubes were immersed in seawater in a water tank, a longer time was taken to initiate luminescence and the luminescence continued for a longer time as the concentration of carboxymethyl cellulose was increased.

Accordingly, the time for initiating luminescence in water can be controlled and the duration of the luminescence also becomes possible, when the luminescent bait for fishing according to the present invention is used.

It can also be seen that when the bait of the invention reaches an objective depth in seawater, it can effectively emit light.

EXAMPLE 57

| | |
|---|---|
| Preparation of fish-gathering light: | |
| Luciferin | 0.1 g |
| Luciferase (Kikkoman Corporation) | 0.2 g |
| ATP | 5.0 g |
| Tris(hydroxymethyl)aminomethane (buffer agent) | 2.5 g |
| Sucrose (enzyme stabilizer) | 4.0 g |

These components were mixed uniformly and formed in a tabletting machine into disk-shaped tablets of a luminescent plaything (about 100 mg/tablet) with a diameter of 10 mm and a thickness of 1 mm.

The tablets were divided into 4 groups: the first group was immersed in 0.5% (W/W) carboxymethyl cellulose solution; the second group in 1% (W/W) carboxymethyl cellulose solution; the third group in 2% (W/W) carboxymethyl cellulose solution; and the fourth group in 3% (W/W) carboxymethyl cellulose solution, after which these groups were lyophilized again.

Three tablets each of these 4 groups were put in a mesh bag, then connected to a fishing line near a hook, and placed in seawater. As a result, it was found that the elution of the luminescent components was prevented and the luminescence continued for a longer time as the concentration of carboxymethyl cellulose was increased.

INDUSTRIAL APPLICABILITY (1) The 3 components i.e. luciferin, luciferase and ATP, or the 4 components i.e. these components plus a metal salt can be used to produce various playthings emitting a soft light of an indescribable vivid color not obtainable from flames of conventional candles.

Conventionally, the bioluminescent system found in fireflies is known besides the system of converting electric energy into light for incandescent lamps and luminescent lamps.

However, an illumination apparatus where luminescent bacteria containing luciferase are used in a luminescent system (JP-A-61-258889) and a process for producing a luminous body containing luminescent bacteria (JP-B-56-15228) are only known as those utilizing this bioluminescent system. These inventions are advantageous in that an illumination apparatus using a light source capable of emitting a light having a different tone of color from conventional one can be provided, but they are disadvantageous in that the apparatus for culturing luminescent bacteria, preparation of a medium and management of culture are required, and the operation of the apparatus may cause a problem with the toxicity of luminescent bacteria to human body, and there are further problems such as microbial spreading and pollution in the atmosphere and the treatment of waste liquid after used for washing the apparatus.

By contrast, the luminescent plaything used in the present invention is advantageous in that it is not toxic to human body, can be used without anxiety in a table, and does not pollute the environment; it is not necessary to use any apparatus; and luminescence can be obtained easily.

(2) The 4 components of luciferin, luciferase, ATP and a metal salt are contained in amounts of 0.01 mM or more, 0.015 mg/ml or more, 0.002 mM or more, and 0.02 mM or more, respectively, whereby luminescence that is worthy of appreciation and sufficiently satisfactory when observed with the naked eye can be provided.

(3) Upon the luminescence reaction proceeding by the action of pyruvate orthophosphate dikinase in the presence of phosphoenolpyruvic acid, pyrophosphoric acid, magnesium ions luciferin, luciferase and ATP, the ATP consumed by the reaction is continuously regenerated, thereby being able to provide a luminescent plaything with highly stable luminescence without increasing the amount of ATP, luciferin and luciferase added.

(4) In the luminescent plaything comprising a combination of 4 components of luciferin, luciferase, ATP and a metal salt, the 4 components being not simultaneously mixed in a liquid state, at least one of the 4 components is granulated so that a beautiful luminescence of an arbitrary shape (e.g., circle-, star-, heart-, ball-, triangle-, or alphabet-shap) is obtained in transparent water, and the duration of the luminescence is increased.

Further, the dissolution rate of the luminescent plaything in water can be arbitrarily controlled by changing the hardness of the granulated material and the bulk density of the texture, and thus the duration of luminescence can be controlled, and further the granulated material is structured in such a concentric circle that luminescent layers and non-luminescent layers are laminated alternately to form a multi-layer construction whereby the luminescence can be intermittently depressed as the granulated material is dissolved, or the shape and size of the granulated material are selected and its surface is sprayed with water or is brought into contact with a wet cloth whereby a new type of luminescent plaything not known so far can be provided.

Furthermore, while the luminescence generally utilizing a luciferase derived from a firefly emits a monochromatic (yellow or yellowish green) light, the present applicant has developed luciferases emitting red light and orange light in addition to the prior art yellow light. However, it is difficult that these 3 kinds of luciferases emit yellow, red and orange lights in the same solution, and it is also difficult that these lights are enjoyed (because the lights are mixed), so it has strongly been desired.to solve this problem. The present inventors have now found that plural kinds of lights (such as yellow, red and orange lights) are emitted in the same solution like a mirror ball or marbles by previously granulating these 3 kinds of luciferases and mixing the granulated materials with other components necessary for luminescence.

In addition, it is dished up on a small dish in a room, whereby a luminescent plaything utilizable as a mood lamp emitting various kinds of amusing luminescence simultaneously on the small dish can also be obtained.

(5) Of the components necessary for bioluminescence, at least one or all components are adsorbed, or adhered to an arbitrary carrier, and then brought into contact with water containing the remaining components or with water, whereby luminescence having a desired shape and a three-dimensional structure can be maintained not only in the container but also outside the container, and a luminescent plaything excellent in luminescence stability can thereby be obtained.

(6) Of components necessary for bioluminescence, at least one or all components, after optionally granulated or after adsorbed or adhered to an arbitrary carrier, are covered on the surface thereof with a water-soluble substance, whereby the elution of the components necessary for bioluminescence into water is somewhat delayed or the spreading of the components is prevented, thus being capable of providing a luminescent plaything by which the time to initiate luminescence can be regulated and topically strong luminescence can continue.

And the luminescent plaything can topically emit a light when it has reached an objective depth (or point) in seawater, so it can be used preferably as a luminescent bait for fishing. The luminescent plaything which is particularly preferable as luminescent bait for fishing can be obtained by which the rapid elution and spreading of the components necessary for luminescence are prevented in water, the time for initiating luminescence is controlled, and topical luminescence continues.

(7) When water-insoluble materials such as glass marbles, rock ice (rock-shaped ice-like plastic or acrylic materials), novel-metal foil (aluminum foil) etc. are provided in the bioluminescent liquid, the luminescence is emitted irregularly thereby increasing the glitter and further increasing the beauty.

(8) A coloring matter is added to the bioluminescent composition whereby a desired tone of color can be obtained for luminescence, and a light with color preferred to a target fish or depending on the type of fish can be emitted.

(9) of the components necessary for bioluminescence, at least 2 components are put in a light- and gas-impermeable container, then at least one matter selected from the group consisting of an antioxidant, a desiccant and an inert gas is added thereto and the container is closed tightly, whereby it is possible to prevent reduction in luminescence stability. This tightly closed container is stored under forcible cooling whereby it is possible to prevent reduction in luminescence stability.

(10) It is possible to provide luminescent playthings which can be used preferably as various ornamental candles such as in Christmas Eve, birthday parties, various parties, table lights, candlelight survices in wedding receptions, lighting for camp, illuminating playthings for night fishing, fish-gathering lamps, and safety candles, table lights, pen lights, lights on ice, luminescent inks, luminescent pens, luminescent coatings, or luminescent writing implements.

(11) The illuminating plaything for night fishing may be used for 1) brightening the steps and hands of fishermen at the time of night fishing and 2) brightly illuminating fishing tackle, a hook (including a fly), a sinker, a float, and fishing rod as a whole or topically.

(12) The fish-gathering lamp may be used to improve fishing efficiency by use of the property (chemotaxis) of fish gathering toward light, and in this case, the luminescent plaything itself is used on water, for example, on river water, lake and marsh water or sea, or in water.

(13) For use in water, there are the following methods: 1) the luminescent plaything of the present invention in the form of liquid, solid or powder, which, directly or after encapsulated in a water-permeable or water-impermeable packaging bag, may be introduced into or embedded in a bait (e.g., fly; natural, synthetic or semi-synthetic bait; and chum) for various fishing or bred fishes, or mixed with the whole of the bait for the fishing or bred fishes, or applied (or adhered) to the surface of the bait, whereby the bait itself emits light; and 2) the luminescent plaything may be placed and kept near to the bait, hook etc. whereby a place in the vicinity of the bait and hook is kept bright.

(14) Because the luminescent plaything does not use fire, there is no anxiety about fire.

(15) If 4 components of luciferin, luciferase, ATP and a metal salt are in the form of dry powder, these 4 components may be dissolved in water, a buffer, or surface water on ice and allowed to react simultaneously, whereby the luminescence reaction is initiated, so a truly magic and amusing luminescent plaything can be provided.

When the powdery luminescent plaything is sprayed on ice, it dissolved in surface water on ice to initiate luminescence. It is surprising and amusing. Thus the novel luminescent plaything can be provided. In this case, because the luminescent plaything is merely sprayed on ice, it is not necessarily required to introduce the luminescent plaything into a container, thus the trouble of carrying an empty container after use can be eliminated.

Further, ice can be shaped arbitrarily and its surface can arbitrarily be given luminescence, so the luminescence can be exhibited in any arbitrary form on the ice surface. Further, if the luminescent plaything of the present invention is dissolved in water, the respective components are uniformly dissolved as a whole, so the amount of each component necessary to achieve sufficient luminescence is increased, whereas if it is dissolved on the surface of ice, the amount of water can be made small, thus strong luminescence can be given efficiently using small amounts of the components. In addition, in the case of luminescence on ice, the luminescent plaything is gradually dissolved as ice is melted. If the luminescent plaything is dissolved in water all at once, the luminescence decays with time, but this is greatly improved, that is, the luminescence vividly persists in harmony with the speed of melting of ice.

(16) In the luminescent plaything comprising a combination containing 4 components of luciferin, luciferase, ATP and a metal salt which are not simultaneously contained in a liquid state, the 4 components are divided into a group of a luminescent base ink containing at least one of the components and a group of a luminescent ink ancillary material containing the other components, and one of the groups is fixed by adhesion or adsorption to an arbitrary carrier (such as paper, woven fabric, nonwoven fabric, or wood), and the other group is maintained in an ink accommodating part in a writing implement and then is used to write desired letters, figures, drawings etc. on the surface of the carrier to emit a light whereby luminescent letters, luminescent figures, luminescent drawings etc. can be drawn.

(17) The dried luminescent plaything comprising the 3 components of luciferin, luciferase and ATP, substantially free of a metal salt, does substantially not contain a metal salt, so even if it is moistened carelessly before use as a plaything or dissolved in pure water or deionized water at the time of preparation, luminescence is not initiated and the luminescent components are not consumed. Accordingly, the value of the plaything as a commodity cannot be lost.

(18) Further, because the present invention does not make use of a living organism as such, the storage and management of a microorganism is not required, and the luminescent plaything can be stored for a prolonged period of time. When the luminous body is disposed of, no sterilization treatment is necessary, and in a room and place where this luminous body is used, there does not occur any problem with environmental pollution caused by the contamination with the used microorganism and spreading thereof. Thus it is highly safe. Further, the strength or duration of luminescence from the luminous body can be controlled easily and arbitrarily by suitably changing the concentrations of the components necessary for luminescence and other components added optionally.

What is claimed is:

1. A luminescent plaything comprising four components of luciferin, Coleoptera luciferase, ATP selected from free ATP or salts thereof, and a divalent metal salt as bioluminescent components, the four components being not simultaneously mixed in a liquid state, wherein the luciferin, Coleoptera luciferase, ATP, and divalent metal salt are contained in amounts of 0.03 to 50 mM, 0.15 to 20 mg/ml, 0.02 to 50 mM, and 0.02 mM or more, respectively.

2. The luminescent plaything according to claim 1, wherein the luciferin is contained in amounts of 0.1 to 12 mM.

3. The luminescent plaything according to claim 1, wherein the Coleoptera luciferase is contained in amounts of 0.15 to 5 mg/ml.

4. The luminescent plaything according to claim 1, wherein the ATP is contained in amounts of 0.2 to 20 mM.

5. The luminescent plaything according to claim 1, wherein the divalent metal salt is magnesium sulfate.

6. The luminescent plaything according to claim 5, wherein the magnesium sulfate is contained in amounts of 0.1 to 300 mM.

7. The luminescent plaything according to claim 5, wherein the magnesium sulfate is contained in amounts of 0.5 to 100 mM.

8. The luminescent plaything according to claim 1, wherein at least one of the components is granulated.

9. The luminescent plaything according to claim 8, wherein the granulated component comprises luminescent and non-luminescent layers.

10. The luminescent plaything according to claim 1, wherein at least one of the components is adsorbed or adhered to a carrier.

11. The luminescent plaything according to claim 1, wherein the divalent salt is in the form of environmental water.

12. The luminescent plaything according to claim 11, wherein the environmental water is selected from the group consisting of seawater, lake and marsh water, river water, ground water, tap water, and mineral drinking water.

13. The luminescent plaything according to any one of claims 1, 2, 3, 4, 5, 6, or 7, wherein the luminescent plaything is a candle, a table light, a pen light, illumination, an illuminating plaything for camp, an illuminating plaything for night fishing, a fish-gathering lamp, a safety candle, a neon light, a light on ice, a luminescent ink, a luminescent pen, a luminescent coating, or a luminescent writing implement.

* * * * *